US011164343B1

(12) United States Patent
Batra et al.

(10) Patent No.: US 11,164,343 B1
(45) Date of Patent: Nov. 2, 2021

(54) SYNTHESIZING BRUSH STROKES BASED ON USER-DEFINED STROKES

(71) Applicant: Adobe Inc., San Jose, CA (US)

(72) Inventors: Vineet Batra, Delhi (IN); Praveen Kumar Dhanuka, Howrah (IN); Nathan Carr, San Jose, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/067,675

(22) Filed: Oct. 10, 2020

(51) Int. Cl.
*G06T 11/00* (2006.01)
*G06T 11/40* (2006.01)
*G06F 3/08* (2006.01)
*G06F 3/0488* (2013.01)

(52) U.S. Cl.
CPC .......... *G06T 11/001* (2013.01); *G06F 3/0488* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0168476 | A1* | 8/2005 | Levene | G06T 15/503 345/582 |
| 2011/0216976 | A1* | 9/2011 | Rother | G06K 9/34 382/173 |
| 2013/0120237 | A1* | 5/2013 | DiVerdi | G06F 3/0416 345/156 |
| 2013/0120426 | A1* | 5/2013 | DiVerdi | G06T 11/001 345/589 |
| 2016/0350942 | A1* | 12/2016 | Asente | G06T 11/001 |
| 2017/0372455 | A1* | 12/2017 | Winnemoeller | G06T 5/003 |

OTHER PUBLICATIONS

Jobard, Bruno and Wilfrid Lefer, "Creating Evenly-Spaced Streamlines of Arbitrary Density", Proceedings of the eight Eurographics Workshops on visualization in scientific computing, Dec. 13, 1997, 13 pages.

Shewchuk, Jonathan Richard, "Triangle: Engineering a 2D Quality Mesh Generator and Delaunay Triangulator", Applied Computational Geometry: Towards Geometric Engineering, vol. 1148 of Lecture Notes in Computer Science, pp. 203-222. SpringerVerlag, May 1996. From the First ACM Workshop on Applied Computational Geometry.

* cited by examiner

*Primary Examiner* — Wesner Sajous
(74) *Attorney, Agent, or Firm* — Finch & Maloney PLLC

(57) ABSTRACT

Techniques are disclosed for populating a region of an image with a plurality of brush strokes. For instance, the image is displayed, with the region of the image bounded by a boundary. A user input is received that is indicative of a user-defined brush stroke within the region. One or more synthesized brush strokes are generated within the region, based on the user-defined brush stroke. In some examples, the one or more synthesized brush strokes fill at least a part of the region of the image. The image is displayed, along with the user-defined brush stroke and the one or more synthesized brush strokes within the region of the image.

19 Claims, 13 Drawing Sheets

Synthesized strokes 316a
(Spacing between adjacent strokes set at a relatively lower value)

Synthesized strokes 316b
(Spacing between adjacent strokes set at a relatively higher value)

SYNTHESIZING BRUSH STROKES BASED ON USER-DEFINED STROKES

FIELD OF THE DISCLOSURE

This disclosure relates generally to digital graphics applications, and more specifically to techniques for synthetization of brush strokes.

BACKGROUND

Drawing implements such as a paintbrush and pencil are fundamental tools for creating art, and have played a key role in creating visual art throughout human history. More recently such tools have been implemented in the digital graphics domain. For instance, most modern digital graphics applications allow a user to provide individual brush strokes within the confines of a digital canvas. To create a painted graphic using brush strokes in a raster or a vector image, an artist has to create each brush stroke individually to fill the shape being painted. When done properly or otherwise well, this application of brushstrokes requires a high level of expertise, as the artist has to paint mentally-constructed harmonious strokes to generate an aesthetically pleasant result. In addition, this process can be time consuming and monotonous, as brush strokes have to be repeatedly drawn by the artist to fill the entire shape, especially when the shape to be filed is relatively large or complex.

SUMMARY

Techniques are disclosed for synthetization of brush strokes. For example, a method of populating a region of an image with a plurality of brush strokes includes: causing display of the image, with the region of the image bounded by a boundary; receiving input that is indicative of a user-defined brush stroke within the region; generating one or more synthesized brush strokes within the region, based on the user-defined brush stroke, the one or more synthesized brush strokes filling at least a part of the region of the image; and causing display of the image, along with the user-defined brush stroke and the one or more synthesized brush strokes within the region of the image. The boundary of the region of the image may be defined, for example, by one or more Bezier curves. In some cases, generating the one or more synthesized brush strokes includes: generating, based on the user-defined brush stroke, a mesh covering the region, the mesh comprising a plurality of vertices spread throughout the region; generating, based on the user-defined brush stroke, a plurality of vectors covering the region, such that each vertex of the mesh is associated with a corresponding vector having a corresponding direction; and generating a synthesized brush stroke, based on the plurality of vectors. In some such cases, generating the one or more synthesized brush strokes includes: receiving a selection of an attribute indicative of a spacing between brush strokes; and generating the one or more synthesized brush strokes, such that the spacing is maintained between adjacent ones of the user-defined and synthesized brush strokes. In some cases, the spacing between adjacent ones of the user-defined and synthesized brush strokes can be a used-defined or user-configured parameter. The methodology may be implemented, for instance, in a processor-based system, or in a computer program product that includes one or more machine-readable mediums encoded with instructions that when executed by one or more processors cause the methodology to be carried out. Note that a brush stroke can have any number of widths (e.g., ranging from 1 pixel to hundreds of pixels) and be provided by any implement, and is not intended to be necessarily limited to a paint brush tool.

DETAILED DESCRIPTION

Figure 1:
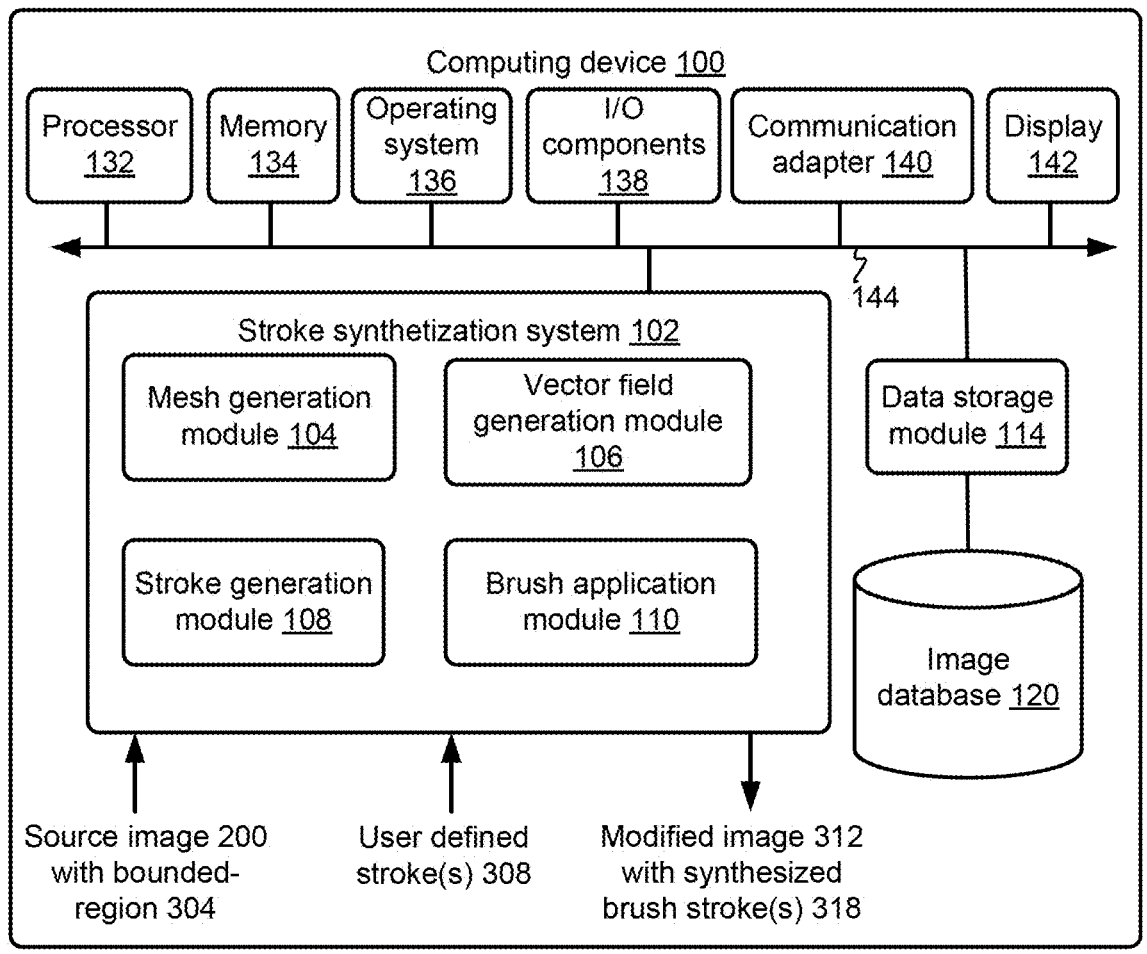
FIG. 1 is a block diagram schematically illustrating selected components of an example computing device configured to synthesize brush strokes within a region of an image, based on one or more user-defined brush stores within that region, in accordance with some embodiments of the present disclosure.

Techniques are disclosed for auto-filling or otherwise populating a region of an image with brush strokes synthesized by a stroke synthetization system. While the techniques can be used in any number of scenarios, they are particularly useful in digital graphics applications. For example, in a stroke synthetization system, one or more user-defined brush strokes are received within the region of the image. The stroke synthetization system generates one or more synthesized brush strokes within the region, based on the user-defined brush strokes. For instance, in some such cases, the stroke synthetization system uses the user-defined brush strokes as guiding strokes to determine paths of the synthesized brush strokes. Thus, a user is free to provide as few or as many user-defined brush strokes as is desired, and the stroke synthetization system can then engage to effectively auto-complete the painting by synthesizing additional brush strokes to fill the region. In some such embodiments, note that the user has control as to when the stroke synthetization system engages. Thus, professional graphical artists and others that may appreciate the artistic process of providing user-defined brush strokes can provide as many strokes as desired (e.g., 90% or more, or even all of strokes), and those that appreciate the efficiency and/or artistic ability of the stroke synthetization system can provide as few strokes as desired (e.g., 1 to 3 strokes).

In any such cases, and according to some embodiments, the stroke synthetization system generates synthesized brush strokes by generating a mesh comprising a plurality of non-overlapping triangles that cover the region to be filled. In some such embodiments, the mesh defines a plurality of vertices spread throughout the region, where each vertex is co-located with a corresponding corner of a triangle. The stroke synthetization system then generates a vector field comprising plurality of vectors covering the region, such that each vertex of the mesh is associated with a corresponding vector having a corresponding direction. In some such embodiments, the stroke synthetization system uses the user-defined brush strokes as guidance when determining directions of the vectors of the vector field. The stroke synthetization system then generates the synthesized brush strokes, based on the plurality of vectors. For example, a path of a synthesized brush stroke is traced based on the directions of the vectors of the vector field. The resultant synthesized brush strokes are to an extent similar in direction to the user-defined brush strokes, and auto-fills the region of the image.

As will be appreciated in light of this disclosure, a brush stroke can have any number of widths (e.g., ranging from 1 pixel to hundreds of pixels). This applies to both user-defined brush strokes provided by a user, as well as synthesized brush strokes generated by the stroke synthetization system. To this end, the terms "brush stroke" or more simply "stroke" as used herein are not intended to be necessarily limited to strokes provided by paint brush tools, but may be more generally applied to strokes provided by any implement that can provide a stroke in the context of a digital graphics application. Such implements include, for instance, a digital paintbrush tool, a digital pencil and pen tool, a digital air-brushing tool, a texturing or scraping tool, or any other digital implement that allows a user to provide a stroke in a digital graphics application. Further note that the implement selected by the user can then be manipulated using any available user interface. For instance, in some example cases, the selected tool manifests in the digital graphics application as a cursor that can be dragged by a click-hold-drag mouse-based operation performed by the user. In another example case, the selected tool manifests in the digital graphics application as a cursor that can be dragged by a stylus (active or passive) or a user's finger, as the case may be.

General Overview

As noted above, there exists a number of non-trivial issues associated with filling, by a user, a digital image with brush stroke. For example, the user has to create each brush stroke individually to fill the shape being painted. This can require a relatively high level of both artistic and technical expertise that many users of digital graphics application lack. In addition, some users prefer efficiency over laborious artistic endeavors, which tends to render most if not all existing digital graphics applications less helpful for such users, as brush strokes have to be repeatedly and skillfully drawn by the user to fill the entire shape.

Thus, techniques are provided herein for populating a region of an image with brush strokes synthesized by a stroke synthetization system. In some embodiments of the present disclosure, once a user of a digital graphics application defines or inputs one or more brush strokes within a region of an image, the digital graphics application can use those user-defined brush strokes as a guidance, and synthesize similar brush strokes to fill the region of the image. For example, the user draws one or more user-defined brush strokes on a given digital canvas and within the confines of an outlined region within the image, which are then used to auto-synthesize brush strokes to fully paint at least a portion of that region of the image.

A "user-defined" brush stroke, as used herein, refers to a brush stroke provided or otherwise defined by a user. For example, a user defines (e.g., inputs or draws or otherwise commands) a path of such brush strokes relative to the image. For instance, the user uses an appropriate input device (such as a mouse, a trackpad, or a touch-screen display of a computing device) to input one or more paths of brush strokes relative to the image, in the context of a digital graphics application. In any such cases, the digital graphics application will typically include digital tools that can be selected (e.g., paint brush, pencil/pen, air-brush, or other such implements) to provide such strokes. In some cases, the digital graphics application may allow the user to provide such strokes by, for instance, using a mouse or track pad to select a given tool and to drag the cursor within the area of a displayed region to be filled. Likewise, in cases where the digital graphics application is executing on a touchscreen display device, the digital graphics application may allow the user to provide such strokes by, for instance, using a finger or stylus to select a given tool and to drag the finger or stylus within the area of a displayed region to be filled. In any such cases, the computing device then displays brush strokes along the user-provided or user-defined paths. Hence, such brush strokes are referred to herein as "user-defined" brush strokes. Again, recall that such user-defined brush strokes can have any desired width (i.e., the width of the user-defined brush strokes can be a user-configurable parameter), and can be provided by any implement and are not necessarily limited to paint brush tools.

In contrast, a "synthesized brush stroke" as used herein refers to a brush stroke having a path that is synthesized or determined by a stroke synthetization system or methodology configured in accordance with an embodiment of the present disclosure. Once the stroke synthetization system or methodology determines such paths, the "synthesized brush strokes" are generated and displayed along such synthesized paths. Hence, such brush strokes are referred to herein as "synthesized" brush strokes. Again, recall that such synthesized brush strokes can have any desired width as appropriate (i.e., the width of the synthesized brush strokes can be a user-configurable parameter), and can be provided to have the same look and feel as any stroke-providing implement available within the context of the given digital graphics application and are not necessarily limited to paint brush tools.

Auto-filling or otherwise populating a region of an image using synthesized brush strokes, as discussed herein, may provide a drawing experience to a user. For example, as discussed herein, the user can draw a few user-defined brush strokes, which are then used to synthesize brush strokes to completely paint a given region of the image. A user is free to provide as few or as many user-defined brush strokes, and the stroke synthetization system effectively auto-completes the painting by synthesizing additional brush strokes to fill the region. According to an embodiment, the synthesized brush strokes are synthesized based on the user-defined brush strokes and extend in the same general direction of the user-defined brush strokes. That is, the user-defined brush strokes are used as guiding strokes by the stroke synthetization system, while generating the synthesized brush strokes.

Furthermore, in some example embodiments, after generation of the synthesized strokes, if the user switches to a different implement, such as from one brush style to another, or from a brush tool to a pencil tool, the strokes are automatically adjusted as per the new implement style. The user can also change spacing between adjacent strokes and/or width of the strokes, in which case the synthesized strokes are automatically re-generated with the selected spacing and/or width, according to some embodiments.

Thus, such a stroke synthetization system allows the user to effortlessly explore numerous stroke variations, without having to redraw the strokes again and again.

The stroke synthetization system can generate the synthesized brush strokes using a number of techniques. For example, initially, a computing device displays an image. The image includes a region that is bounded by a boundary. The user-defined brush strokes and the synthesized brush strokes are to fill the region. In some such examples, the region can encompass the entire image, while in some other examples, the region comprises merely a section of the image. The image can be, for instance, a raster image or a vector image, or any other type of image that can be edited using the techniques provided herein. In some examples, the boundary of the region is in vector form, and comprises one or more Bezier curves.

In some such embodiments, the stroke synthetization system receives one or more inputs indicative of paths of one or more user-defined brush stroke(s) within the region of the image. An input is, for example, a user input that is received via an appropriate I/O components, such as one or more of a tactile keyboard, a touch sensitive or touch-screen display, a mouse, a trackpad, a microphone, a camera, scanner, and/or another appropriate input device that can provide user input defining one or more brush strokes. For example, the user can, using the mouse or a touch-screen display, draw a brush stroke on the image. The user-defined brush strokes are either originally input in vector form, or converted in vector form from a raster form, according to some such embodiments.

In some such embodiments, the stroke synthetization system generates one or more synthesized brush strokes within the region, based on the user-defined brush strokes. In some examples, because the stroke synthetization system generates one or more synthesized brush strokes within the region based on the user-defined brush strokes, the stroke synthetization system can also be referred to as a stroke generation system. To generate the synthesized brush strokes within the region of the image according to one such embodiment, the stroke synthetization system (e.g., a mesh generation module included in the stroke synthetization system) generates a mesh that covers the region of the image. In some such embodiments, the mesh is a triangle mesh, such that a plurality of triangles forming the mesh is overlaid on the image. Although a triangle mesh is discussed herein, the mesh can comprise another appropriate geometrical form, such as a rectangle or a square. Tiling or tessellation of the region is performed using the mesh, such that the triangles of the mesh is overlaid on the region with no overlaps and gaps between the triangles. In some such embodiments, the user-defined strokes align with edges of a subset of the triangles of the mesh. For example, each user-defined stroke is divided into a corresponding plurality of sections. Each section of the user-defined strokes overlaps a corresponding edge of a corresponding triangle of the mesh. In some such embodiments, a size of an individual triangle is based on a curvature of a corresponding adjacent section of a user-defined brush stroke and/or a curvature of a corresponding adjacent section of the boundary. In some such embodiments, corners of the triangles of the mesh form vertices of the mesh. Thus, a plurality of vertices of the mesh is spread throughout the region of the image. In some such embodiments, the mesh is generated using Conforming Delaunay Triangulation (CDT), although any other type of mesh generation methodology can be adapted, as long as the triangles of the mesh are spread throughout (e.g., tiling or tessellating) the region. Subsequent to the generation of the mesh, the stroke synthetization system (e.g., a vector field generation module included in the stroke synthetization system) generates, based on the user-defined brush stroke, a vector field comprising plurality of tangential vectors covering the region. In some examples, each vertex of the mesh is associated with a corresponding tangential vector having a corresponding direction. For instance, a corner of a triangle coincides with one or more corners of one or more adjacent triangles, and all overlapping or co-located corners have a single corresponding vector. As the triangles of the mesh fill the region, the vectors of the vector field also cover the region of the image.

In some such embodiments, each vector has a corresponding direction. For example, a vector that overlaps a section of a user-defined stroke is tangential to the section of the user-defined stroke. In some such embodiments, since user-defined strokes are represented as cubic Bezier splines, computing tangent direction at a point on the spine is done by determining the parametric value, t of the section of the user-defined stroke with which the vector overlaps, and then taking a first derivative of the parametric value. On the other hand, a vector that does not overlap a section of a user-defined stroke is somewhat parallel to a nearby section of the user-defined stroke. For example, there is no major disjoint in direction of adjacent vectors of the vector field. For instance, any two adjacent vectors are parallel, or substantially parallel (e.g., have an angle of at most 10 degrees or 20 degrees, where an angle of 0 degree indicates the two vectors are parallel). Thus, the vector field has a smoothness in directions of the vectors, and there is no sudden shift in direction of adjacent vectors.

In some such embodiments, the generation of the vector field is formulated as a bi-harmonic solve to compute tangent directions at each vertex of the mesh. To establish boundary conditions for the solve, tangential values are computed using vectors that are on the user-defined strokes. Thus, the vectors have directions that are based on the user-defined strokes, as will be discussed in further detail in turn. Put differently, the vector field generation module uses the user-defined strokes as guidance when determine the directions of the vectors of the vector field. Subsequent to the generation of the vector field, the stroke synthetization system (e.g., a stroke generation module of the stroke synthetization system) generates one or more synthesized stroke(s), based on the plurality of tangential vectors of the vector field. For example, using the vector field, the stroke generation module synthesizes smooth streamlines or paths for the strokes, by fitting Bezier curves with respect to the user-defined strokes.

In some embodiments, a spacing "t" between two adjacent synthesized strokes(s) is a user-configurable parameter or attribute, which can have a default value in case the user does not set this parameter. In other embodiments, the spacing of the synthesized strokes is computed by the stroke synthetization system using a modified line tracing mechanism, e.g., which aims to avoid the formation of short lines and optimize spacing. Thus, for example, tracing (i.e., tracing of the synthesized strokes) is done in manner so that spacing above and below the currently traced synthesized stroke is at distance "t" from adjacent strokes, where the spacing parameter "t" is user configurable or system defined. Likewise, in some embodiments, a width of the individual strokes can also be a user-configurable parameter. The allowable ranges of spacing and stroke width can vary from one embodiment to the next. For instance, in some embodiments the stroke width ranges from a smallest width of 1 pixel to a largest width of 100 pixels (about an inch), although larger widths can of course be used. As will be appreciated, the stroke width can depend on the implement being used to draw the stroke, as well as the spacing between strokes and the size of the area being filled. For example, for a given spacing t between the strokes, if the width of the strokes is set at a relatively high value, then relatively fewer strokes are needed to cover the region. On the other hand, for the given spacing t between the strokes, if the width of the strokes is set at a relatively low value, relatively more strokes are needed to cover the region.

In some embodiments, to initialize synthesizing paths of the strokes, the stroke generation module uses a priority queue of potential seed points (e.g., which form starting points of the stroke paths to be synthesized) for new strokes to be synthesized. The seed points are based on the end points of the user-defined strokes. At each iteration (where during one iteration, one stroke path is synthesized), a seed is considered from this queue—if the seed is sufficiently distant from nearby synthesized strokes (where the sufficiently distant is determined based on spacing parameter "t"), the seed is used to synthesize a path for a new stroke. In some embodiments, a seed point coincides with a corresponding vertex of the mesh described above and further described below. In some embodiments, the seed points also depend on the user-configurable width of the strokes.

In some such embodiments, subsequent to selection of a seed point, the stroke generation module starts tracing (synthesizing) a path for a stroke from the seed point. For example, an initial direction of tracing is the direction of the vector of the vector field that starts from the seed point. Once traversing each unit length (where each vector is also of unit length), the direction of the path of the stroke is again re-evaluated. For example, assume that the stroke has reached a point p1, which coincides with, or is within a threshold distance from a vertex V1 of the mesh. In such a case, a direction of the stroke at point p1 is a direction of a vector that originates at the vertex V1. Assume that the stroke has now reached another point p2, which is more than a threshold distance from a nearest vertex. For example, assume that the point p2 is inside (or on an edge) of a triangle of the mesh. In such a case, nearby vertices Va, Vb, and/or Vc of the mesh, which are nearest to the point p2, are identified (although three vertices are identified, in an example, one, two, four, or higher number of vertices can also be identified instead). In an example, if the point p2 is within a triangle of the mesh, then the vertices Va, Vb, and Vc are simply corners of the triangle. Now, a direction of the stroke at point p2 can be determined by interpolating directions of the vectors originating at the vertices Va, Vb, and/or Vc.

Thus, the stroke starts from a seed point, and a path of the stroke is synthesized based on the vector field. In some embodiments, the stroke is terminated if the stroke comes sufficiently close (e.g., less than the previously discussed spacing parameter t) to another stroke, and/or when the stroke reaches the boundary of the region. After the path of a stroke is fully synthesized (the stroke is terminated), a seed point for an adjacent stroke is calculated and the next stroke path is synthesized.

Once the paths of the strokes are synthesized, the stroke synthetization system (e.g., a brush application module of the stroke synthetization system) applies a brush style to the synthesized strokes, to generate and cause display of synthesized brush strokes. Brush style comprises user-configurable parameters defining, for example, a color of the brush, a texture of the brush, a type of brush, a thickness of the brush, and/or another appropriate brush attribute. Subsequently, the image, along with the region filled with the user-defined brush strokes and the synthesized brush strokes, is displayed. Again, reference to "brush" here is intended to be an example and is not intended to limit the implement to a paint brush; rather, other implements can be similarly used by the stroke synthetization system, as will be appreciated in light of this disclosure.

In some embodiments, after the strokes have been generated, if a user changes a first parameter defining a spacing "t" between adjacent strokes and/or a second parameter defining a width "w" of the strokes, the synthesized brush strokes are automatically re-generated based on the new parameters. Also, whenever the user switches to a different brush style, the synthesized strokes can be automatically adjusted as per new brush style. Numerous variations and embodiments will be appreciated in light of this disclosure. For instance, another user-configurable feature may be the number of user-defined strokes that have to be received before stroke synthesis will engage. In other embodiments, this number may be fixed. In other embodiments, the user can manually engage stroke synthesis after having provided a desired number of user-defined strokes.

System Architecture

FIG. 1 is a block diagram schematically illustrating selected components of an example computing device 100 (also referred to as device 100) configured to synthesize brush strokes within a region of an image, based on one or more user-defined brush stores within the region of the image, in accordance with some embodiments of the present disclosure. As can be seen, the device 100 includes a stroke synthetization system 102 (also referred to as system 102), which allows the device 100 to automatically synthesize brush strokes within a region of an image, based on one or more user-defined brush stores within the region of the image. For example, as will be discussed in further detail in turn, the stroke synthetization system 102 receives a source image 300 with a bounded-region 304, and also receives one or more user-defined strokes 308 that are within the bounded-region 304 (the source image 300 is illustrated in FIGS. 3A-3D, and will be discussed in detail in turn). The stroke synthetization system 102 synthesizes one or more brush strokes 318, based on the user-defined brush strokes 308, where the synthesized brush strokes 318 are also in the bounded-region 304. Thus, the user-defined brush strokes 308 and the synthesized brush strokes 318 at least partially, or fully fill the bounded-region 304. In some other examples, there may be zero user-defined strokes 308, and the stroke synthetization system 102 synthesizes one or more brush strokes 318, based on the boundary of the bounded-region 304 (i.e., the system 102 uses the boundary as an inherent condition to synthesize the one or more brush strokes 318). The stroke synthetization system 102 outputs a modified image 312, which is the source image 200 including the user-defined strokes 308 and the synthesized brush strokes 318. In some embodiments, the computing device 100 causes display of the modified image 312.

As will be appreciated, the configuration of the device 100 may vary from one embodiment to the next. To this end, the discussion herein will focus more on aspects of the device 100 that are related to synthesizing brush strokes in an image, and less so on standard componentry and functionality typical of computing devices. The device 100 comprises, for example, a desktop computer, a laptop computer, a workstation, an enterprise class server computer, a hand-held computer, a tablet computer, a smartphone, a set-top box, a game controller, and/or any other computing device that can synthesize brush strokes based on one or more user-defined strokes within a digital image.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, data storage module 114, and the stroke synthetization system 102. An image database 120 (e.g., that comprises a non-transitory computer memory) stores at least (i) a source image and (ii) a modified image that includes the user-defined and synthesized brush strokes, and is coupled to the data storage module 114. A bus and/or interconnect 144 is also provided to allow for inter- and intra-device communications using, for example, communication adaptor 140. In some embodiments, the system 100 includes a display screen 142 (referred to simply as display 142), although in some other embodiments the display 142 can be external to and communicatively coupled to the system 100. Note that in an example, components like the operating system 136 and the stroke synthetization system 102 can be software modules that are stored in memory 132 and executable by the processor 132. In an example, at least sections of the stroke synthetization system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 138, such as one or more of a tactile keyboard, the display 142, a mouse, a touch sensitive or a touch-screen display (e.g., the display 142), a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the stroke synthetization system 102 implemented on the device 100. In an example embodiment, the system 102 includes a mesh generation module 104, a vector field generation module 106, a stroke generation module 108, and a brush application module 110, each of which will be discussed in detail in turn. In an example, the components of the system 102 are in communication with one another or other components of the device 102 using the bus and/or interconnect 144, as will be discussed in further detail in turn. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the image editing system 102 may be implemented in any application that allows digital content editing, including, but not limited to, ADOBE® ILLUSTRATOR®, ADOBE® LIGHTROOM®, ADOBE PHOTOSHOP®, ADOBE® SENSEI®, ADOBE® CREATIVE CLOUD®, and ADOBE® AFTER EFFECTS® software. "ADOBE," "ADOBE ILLUSTRATOR", "ADOBE LIGHTROOM", "ADOBE PHOTOSHOP", "ADOBE SENSEI", "ADOBE CREATIVE CLOUD", and "ADOBE AFTER EFFECTS" are registered trademarks of Adobe Systems Incorporated in the United States and/or other countries.

Figure 2:
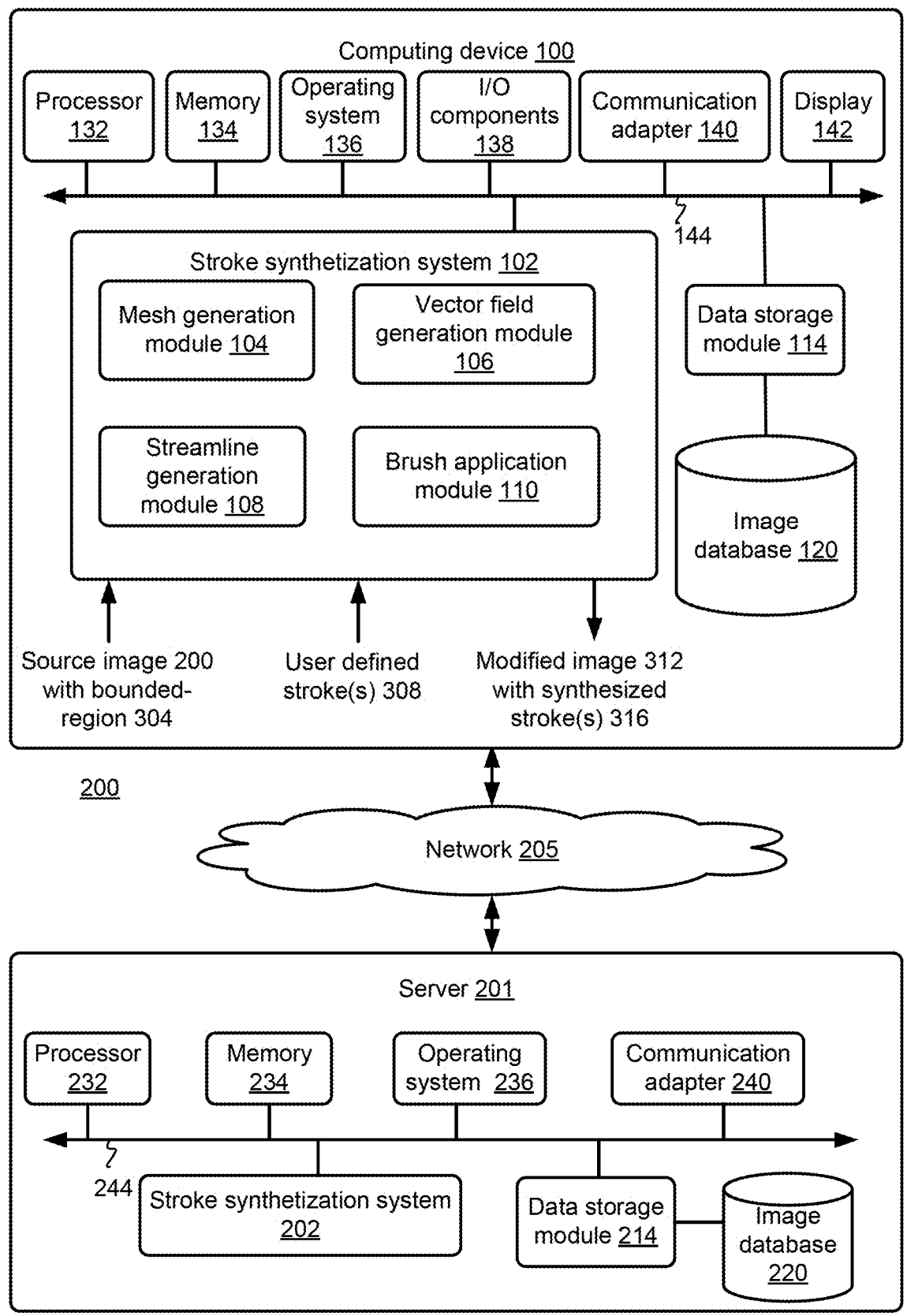
FIG. 2 is a block diagram schematically illustrating selected components of an example system comprising the computing device of FIG. 1 communicating with a server device, where the combination of the computing device and the server device is configured to synthesize brush strokes within a region of an image, based on one or more user-defined brush stores within that region, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to synthesize brush strokes within a region of an image, based on one or more user-defined brush stores within the region of the image, in accordance with some embodiments of the present disclosure.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide stroke synthetization services, as variously described herein. In some embodiments, the server 201 comprises a stroke synthetization system 202 providing such services. Examples of such services include receiving from the device 100 input comprising a source image 200 with a bounded-region 304 and one or more user-defined stroke(s) 308; generating a modified image 312 that includes one or more synthesized brush strokes(s) 318; and transmitting the modified image 312 back to the device 100 for display. Although one server implementation of the stroke synthetization system is illustrated in FIG. 2, it will be appreciated that, in general, tens, hundreds, thousands, or more such servers can be used to manage an even larger number of stroke synthetization functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, a stroke synthetization system 202 (also referred to as system 202), data storage module 214, and a communication adaptor 240. An image database 220 (e.g., that comprises a non-transitory computer memory) comprises source images and/or modified images, and is coupled to the data storage module 214. A bus and/or interconnect 244 is also provided to allow for inter- and intra-device communications using, for example, communication adaptor 240 and/or network 205. Note that components like the operating system 236 and stroke synthetization system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including graphical content such as digital images. As shown, the server 201 includes the stroke synthetization system 202 that communicates with the system 102 on the client device 100. In an example, the stroke synthetization features discussed with respect to FIG. 1 can be implemented in FIG. 2 exclusively by the stroke synthetization system 102, exclusively by the stroke synthetization system 202, and/or may be shared between the stroke synthetization systems 102 and 202. Thus, in an example, none, some, or all stroke synthetization features are implemented by the stroke synthetization system 202.

For example, when located in the server 201, the stroke synthetization system 202 comprises an application running on the server 201 or a portion of a software application that can be downloaded to the device 100. For instance, the system 102 can include a web hosting application allowing the device 100 to interact with content from the stroke synthetization system 202 hosted on the server 201. In this manner, the server 201 synthesizes brush strokes to fill a region in an image, based on one or more user-defined strokes. Thus, the location of some functional modules in the system 200 may vary from one embodiment to the next. For instance, while the mesh generation module 104 is shown on the client side in this example case, it may be on the server side (e.g., within the system 202) in other embodiments. Any number of client-server configurations will be apparent in light of this disclosure. In still other embodiments, the techniques may be implemented entirely on a user computer, e.g., simply as stand-alone image modification application. Similarly, while the image database 120 is shown on the client side in this example case, it may be on the server side in other embodiments, such as a cloud-based image database. Thus, the database of the source and modified images can be local or remote to the device 102, so long as it is accessible by the mesh generation module 104 that is implemented by the system 102 or implemented by the system 202.

Example Operation

Figure 3A:
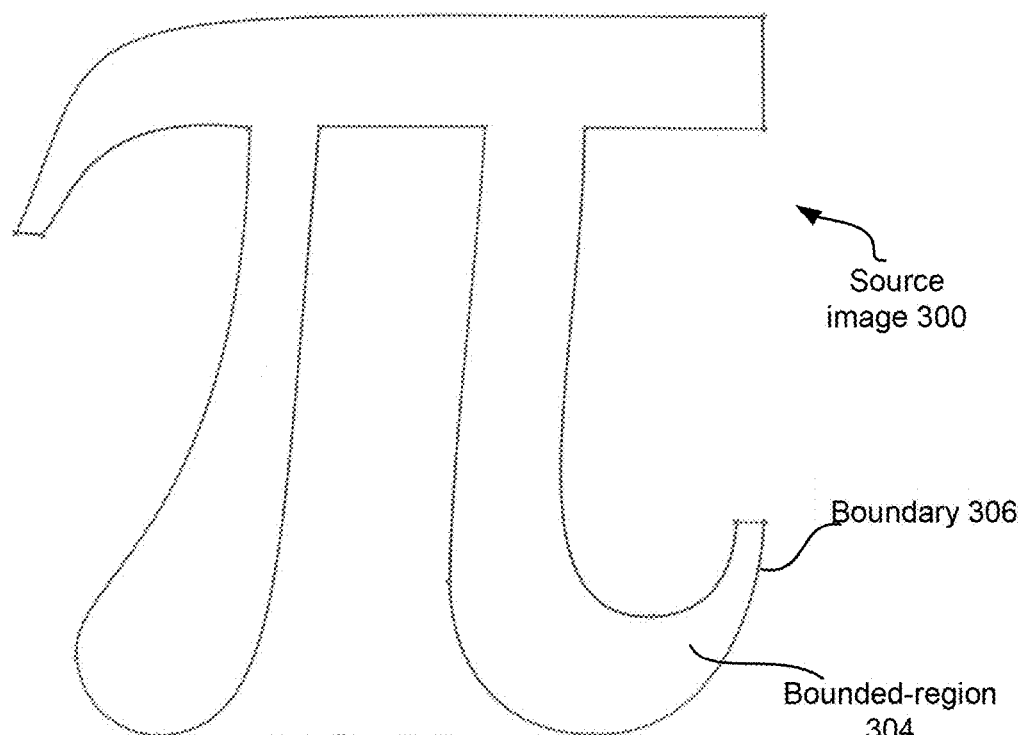
FIGS. 3A-3D illustrate synthetization of brush strokes within a region of an example image, based on one or more user-defined brush stores within that region, in accordance with some embodiments of the present disclosure.
Figure 3B:
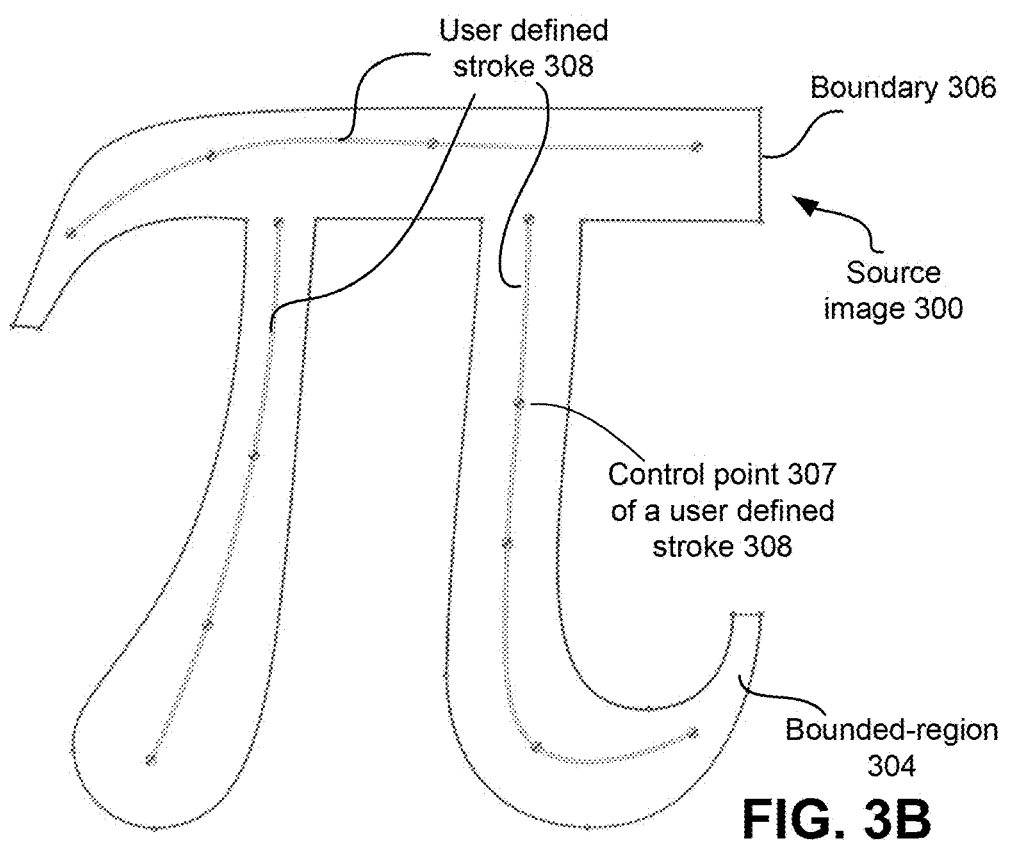
Figure 3C:
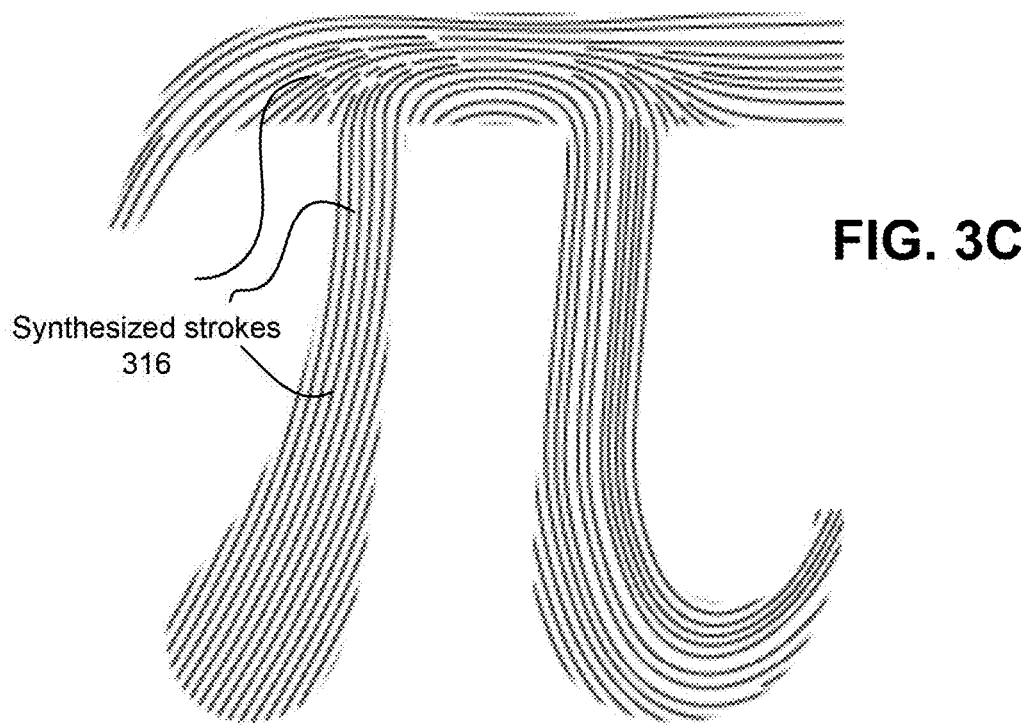
Figure 3D:
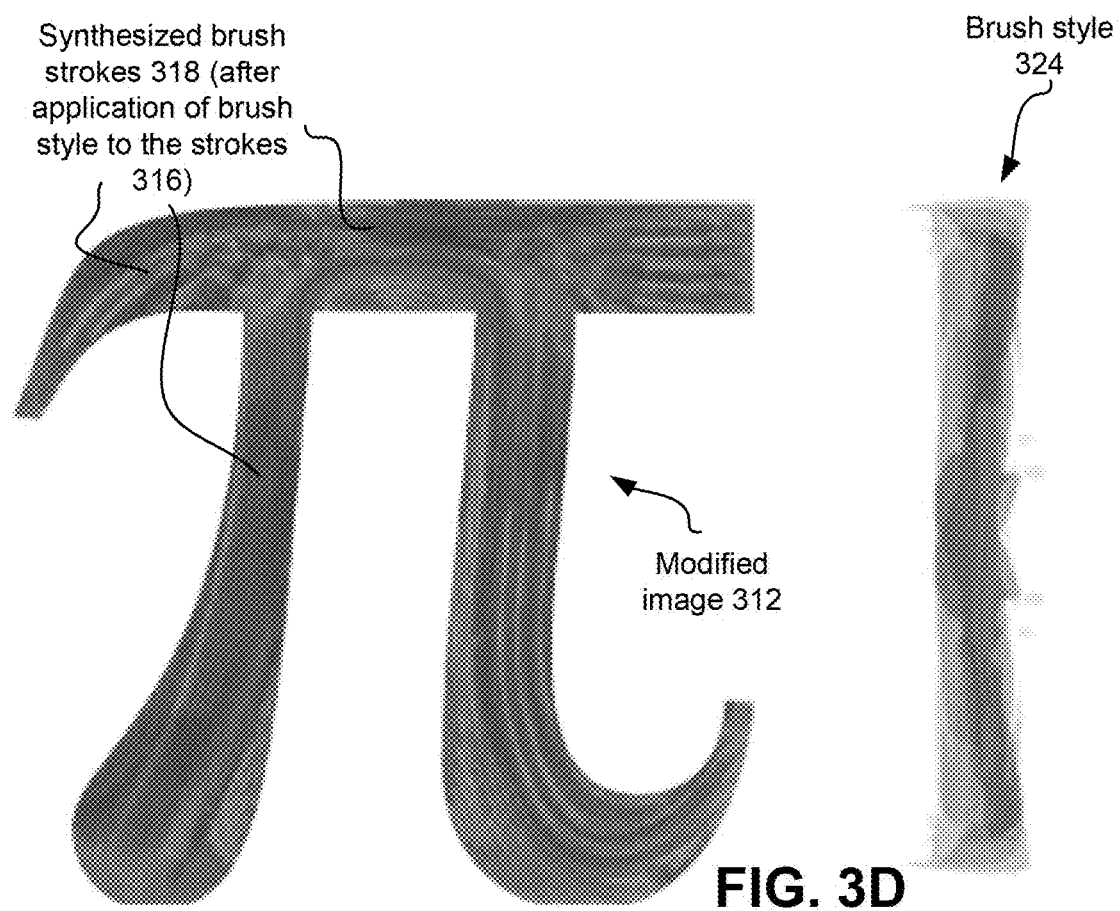
Figure 4A:
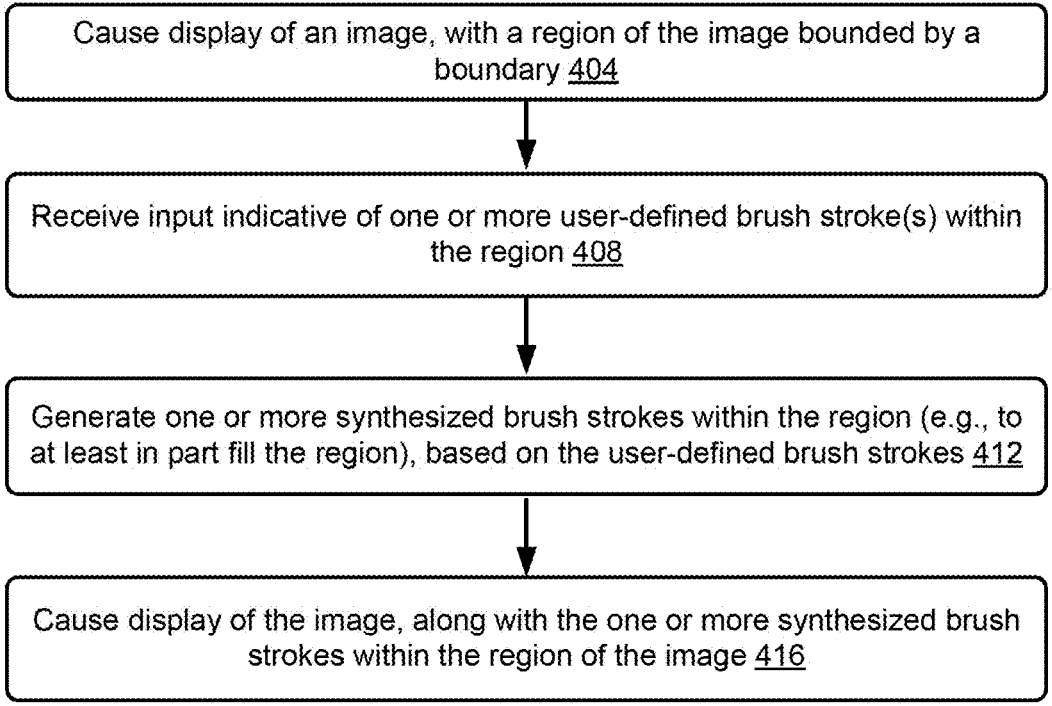
FIGS. 4A-4B are flowcharts collectively illustrating an example methodology for synthesizing brush strokes within a region of an image, based on one or more user-defined brush stores within that region, in accordance with some embodiments of the present disclosure.

FIGS. 3A-3D illustrate synthetization of brush strokes within a region of an example image, based on one or more user-defined brush stores within the region of the image, in accordance with some embodiments of the present disclosure. FIG. 4A is a flowchart illustrating an example method 400 for synthesizing brush strokes within a region of an image (such as the images illustrated in FIGS. 3A-3D), based on one or more user-defined brush stores within the region of the image, in accordance with some embodiments of the present disclosure. FIGS. 3A-3D and the method 400 of FIG. 4A will be discussed in unison.

Method 400 can be implemented, for example, using the system architecture illustrated in FIGS. 1 and/or 2, and described herein. However other system architectures can be used in other embodiments, as apparent in light of this disclosure. To this end, the correlation of the various functions shown in FIG. 4A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. Although various operations of the method 400 are discussed herein as being performed by the stroke synthetization system 102 of the computing device 100, one or more of these operations can also be performed by the stroke synthetization system 202 of the server 201 as well.

Referring to FIG. 4A, the method 400 comprises, at 404, causing display of an image, with a region of the image bounded by a boundary. For example, FIG. 3A illustrates an example source image 300 being displayed, with a region 304 of the image 300 bounded by a boundary 306. In some examples, the image 300 can be a raster image, or a vector image. In some other examples, the image 300 can have some sections that are vectorized (e.g., represented using Bezier curves), while some other section of the image 300 can be rasterized. The image 300, in some examples, is displayed on the display 142 of the device 100. In some embodiments, the system 102 (or some other component of the device 100) causes the display of the image 300 on the display 142.

In some embodiments, the boundary 306 of the image 300 is represented by one or more vector components, such as one or more Bezier curves or Bezier splines (e.g., cubic Bezier splines). Any appropriate Bezier curves or splines can be used, such as linear, quadratic, cubic, and/or another higher order Bezier curves or splines. Thus, in some examples, although sections of the image 300 can be a raster image, at least the boundary 306 of the image 300 is in vector form. In an example, the image 300 can originally include a rasterized boundary 306, which the system 100 (or another component of the system 100) can vectorize, such that the boundary 306 comprises vector components, such as one or more Bezier curves.

The region 304 is a closed region, defined by the boundary 306. In some examples, the region 304 can encompass the entire image 300, while in some other examples the region 304 comprises merely a section of the image 300.

In some examples, the boundary 306 is displayed along with (or included within) the source image 300. In some other examples, the boundary 306 is added to the source image 300 by a user of the device 100. In some examples, the boundary 306 is displayable and is a part of the image 300. In some other examples, the boundary 306 is transparent and/or is not part of the image 300 (e.g., the boundary 306 is deleted after synthetization of the brush strokes). In some such examples, no boundary is displayed, although the boundary can be indicated using some visual aids, such as dotted lines, semi-transparent lines, etc. In some examples when the boundary 306 is a polygon, the boundary 306 is defined by corner points of the polygon. For example, when the boundary 306 is a triangle, the boundary 306 is defined by three points corner points of the triangle, and only the corner points of the boundary are displayed (e.g., instead of displaying the edges of the triangle).

Referring again to FIG. 4A, the method 400 proceeds from 404 to 408, where the system 102 receives an input indicative of one or more user-defined brush stroke(s) within the region of the image. The input is, for example, a user input that is received via an appropriate input component of the I/O components 138, such as one or more of a tactile keyboard, a touch sensitive or touch-screen display (such as the display 142), a mouse, a trackpad, a microphone, a camera, scanner, and/or another appropriate input device that can provide user input defining one or more brush strokes. For example, the user can, using the mouse or a touch-screen display, draw a brush stroke on the image 300. FIG. 3B illustrates some example user-defined brush strokes 308 within the region 304. Although the example of FIG. 3B illustrates three user-defined brush strokes 308, in some other examples, any appropriate number of user-defined brush strokes may be received, such as one, two, four, or higher.

In some embodiments, the user-defined brush strokes can be drawn in a free-form manner by the user, e.g., using a brush or pencil toll. In some such embodiments, the user uses the mouse or trackpad (or another input device) to manually define the path of the brush stroke. In some such examples, thus, the user uses a raster brush to define the path. The raster input is vectorized by the system 100.

In some embodiments, the user-defined brush strokes can be defined using precise drawing tools, such as curve drawing tools. In some such embodiments, the user uses a drawing command, based on which the device generates the brush strokes 308. Such use of drawing tools may be suitable for workflows where high degree of regularity is desired. In some such examples, thus, the user-defined path is in vector form, e.g., comprises one or more Bezier curves.

Thus, the user-defined brush strokes 308 are either originally input in vector form, or converted in vector form. For example, the user-defined brush strokes 308 comprises one or more Bezier curves. The small dots overlapping the user-defined brush strokes 308 illustrated in FIG. 3B are control points or anchor points 307 of the Bezier curves of the user-defined brush strokes 308. In some examples, the user can modify the shape of a user-defined brush stroke 308 by interacting with the control points 307. For example, the user can modify the shape of a user-defined brush stroke 308 by dragging one or more control points 307 using, for example, a mouse or a touch-screen display. In some other examples, the system 102 refrains from displaying such control points 307.

The brush strokes 308 are referred to as "user-defined," as a user explicitly defines a path of the brush strokes 308. For example, as discussed, the user, using an appropriate input device (such as a mouse, a trackpad, or a touch-screen display), inputs one or more paths (such as three paths for the example of FIG. 3B) of the brush strokes 308 relative to the image 300. The device 100 then displays the brush strokes 308 along the user-provided or user-defined paths. Thus, paths of the user-defined brush strokes 308 are input, defined and/or provided by the user of the device 100, and the system 102 (or another component of the device 100) displays the brush strokes 308 along such paths on the image 300.

In contrast, as will be discussed herein in detail in turn, the system 102 automatically generates or synthesizes the paths of the "synthesized brush strokes" 318 discussed in this disclosure, and displays the brush strokes 318 along such paths.

Referring again to FIG. 4A, the method 400 then proceeds from 408 to 412, where the system 102 generates one or more synthesized brush strokes within the region, based on the user-defined brush strokes. For example, the synthesized brush strokes at least in part fill the region 304. FIG. 3C illustrates an example of the synthesized strokes 316 generated by the system 102 (e.g., by the stroke generation module 108 of the system 100 illustrated in FIG. 1). In FIG. 3D, an appropriate brush style 324 is applied to the synthesized strokes 316 (e.g., by the brush application module 110 of the system 100 illustrated in FIG. 1), to generate the synthesized brush strokes 318. For example, right side of FIG. 3D illustrates an example brush stroke style 324 selected by the user. This brush stroke style 324 is applied to the synthesized strokes 316 generated by the system 102, to generate the synthesized brush strokes 318 illustrated in left side of FIG. 3D. Generation of the synthesized brush strokes will be discussed in further detail herein with respect to method 412 of FIG. 4B. It may be noted that in some examples, there may be no user-defined strokes 308, and the stroke synthetization system 102 synthesizes one or more brush strokes 318, based on the boundary of the bounded-region 304 (i.e., the system 102 uses the boundary as an inherent condition to synthesize the one or more brush strokes 318). Thus, in some such examples, the stroke synthetization is performed assuming as if the boundary 306 is a user-defined stroke.

Referring again to FIG. 4A, the method 400 then proceeds from 412 to 416, where the system 102 (or another component of the device 100) causes display of the image, along with the one or more synthesized brush strokes within the region of the image. In some embodiments, the user-defined brush strokes are also displayed along with the synthesized brush strokes. For example, left side of FIG. 3D illustrates the modified image 312 including the synthesized brush strokes 318 being displayed.

Figure 4B:
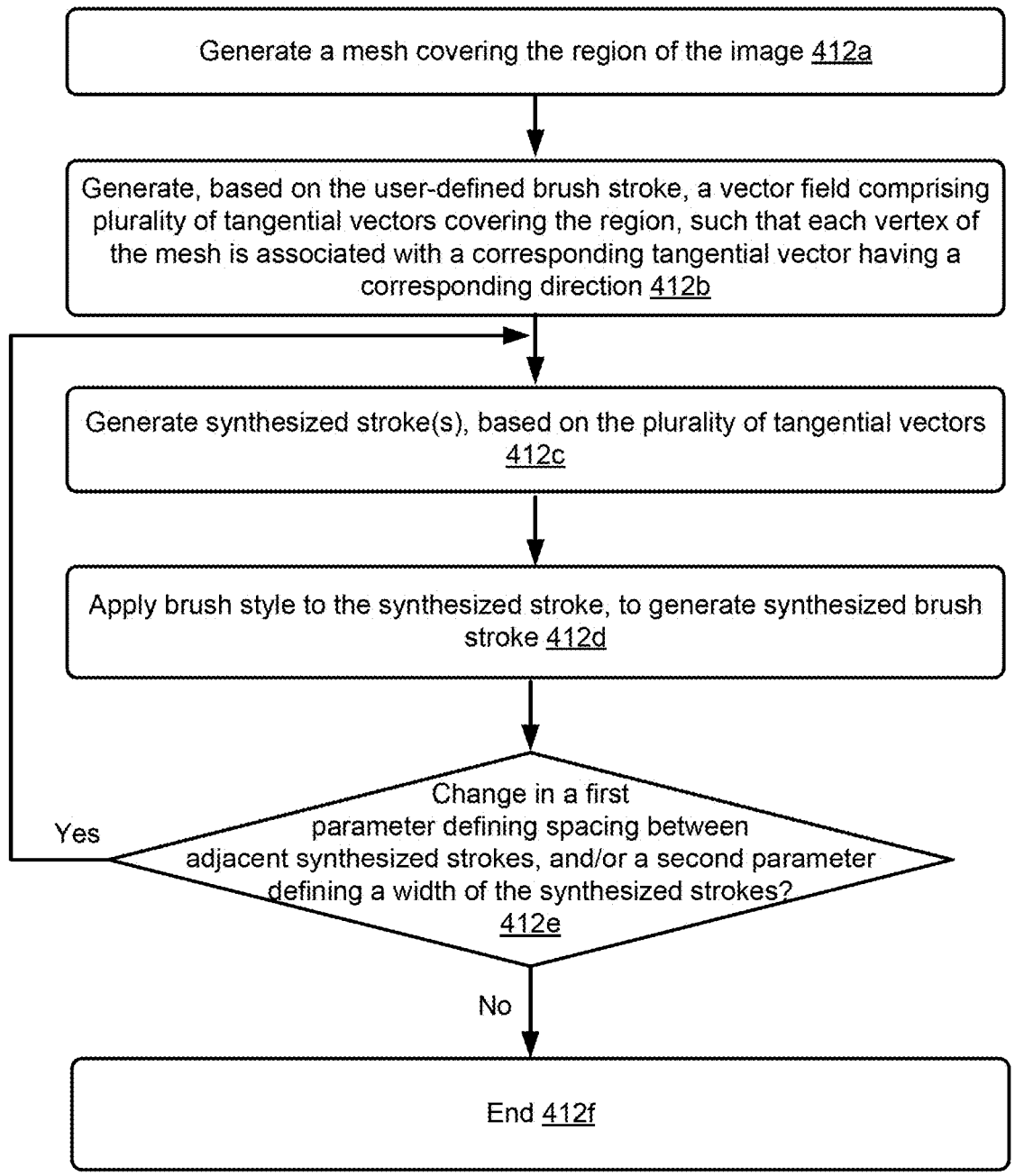

FIG. 4B is a flowchart illustrating an example method 412 for generating one or more synthesized brush strokes within a region of an image, based on one or more user-defined brush strokes, in accordance with some embodiments of the present disclosure. Thus, the flowchart of FIG. 4B illustrates operations associated with the block 412 of the method 400 of FIG. 4A. FIGS. 5A-5H illustrate images depicting various operations discussed with respect to the example method 412 of FIG. 4B, in accordance with some embodiments of the present disclosure.

Figure 5A:
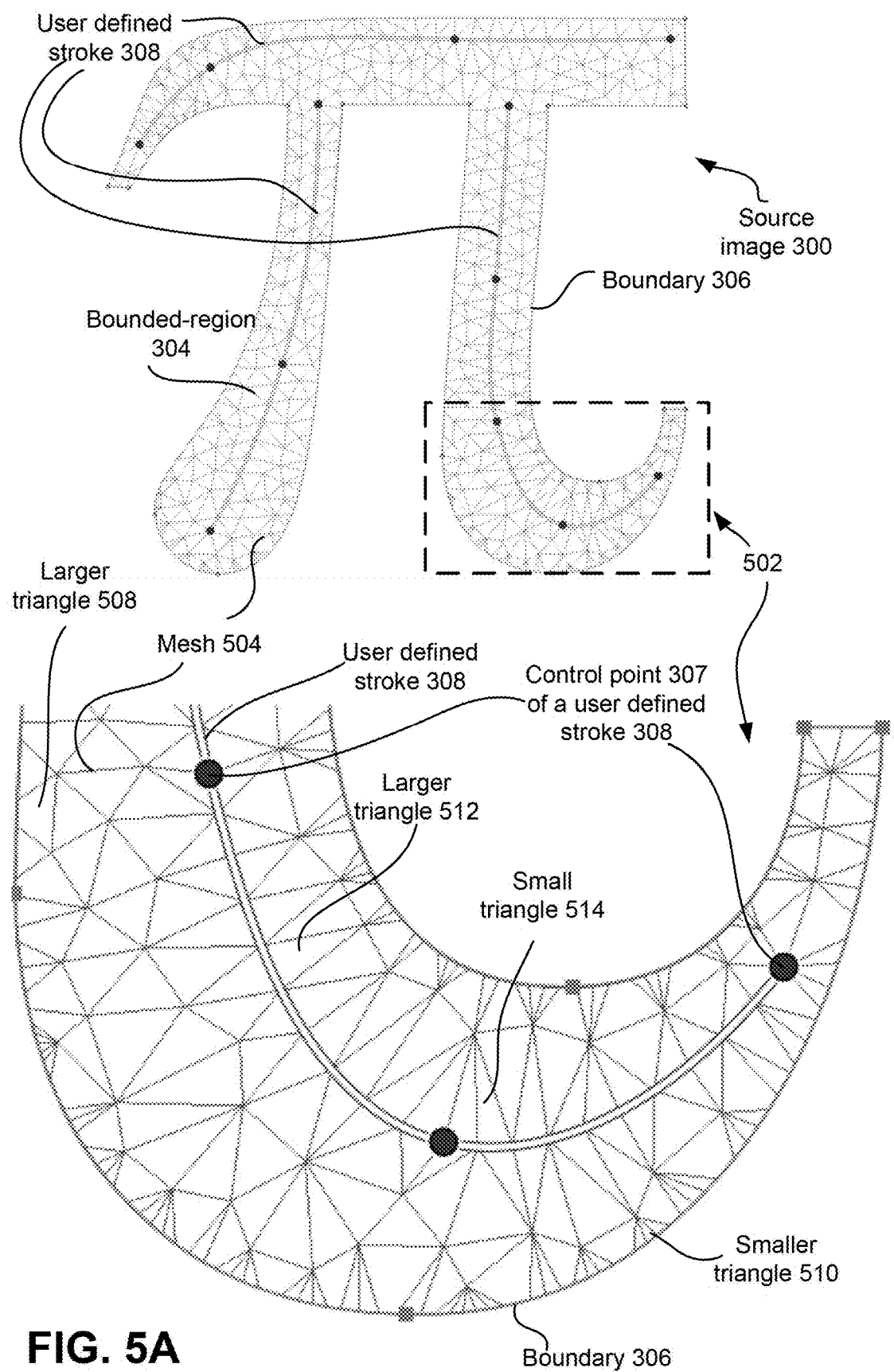
FIGS. 5A-5H illustrate images depicting various operations discussed with respect to the example methodology of FIGS. 4A-B, in accordance with some embodiments of the present disclosure.

Referring to FIG. 4B, at 412a of the method 412, a mesh is generated (e.g., by the mesh generation module 104 of the system 100, as illustrated in FIG. 1). In some embodiments, the mesh covers the region 304 of the image 300 of FIG. 3A. FIG. 5A illustrates a mesh 504 covering the region 304 of the image 300 of FIG. 3B, in accordance with some embodiments. The mesh 504 is generated at 412a of the method 412 by the mesh generation module 104. In some embodiments, the mesh 504 is a triangle mesh, such that a plurality of triangles forming the mesh is overlaid on the image 300. Although a triangle mesh 504 is used, a mesh comprising another geometrical form, such as a rectangle or a square, can also be used in some other examples. Tiling or tessellation of the region 304 is performed using the mesh 504, such that the triangles of the mesh 504 is overlaid on the region 304, with no overlaps and no gaps between the triangles.

In FIG. 5A, a magnified view of a section 502 of the image 300 is illustrated in a bottom section of the figure. As illustrated, each and every portion of the region 300 is covered by a corresponding triangle of the mesh 504. Furthermore, in some embodiments, the user-defined strokes 308 aligns with edges of a subset of the triangles of the mesh 504. Thus, there are some triangles of the mesh 504, each of which has an edge that overlaps with a corresponding section of a corresponding user-defined stroke 308. Put differently, each user-defined stroke 308 is divided into a corresponding plurality of sections. Each section of the user-defined strokes 308 overlaps a corresponding edge of a corresponding triangle of the mesh 504.

In some embodiments, a size of an individual triangle is based on a curvature of a corresponding adjacent section of a user-defined brush stroke 308 and/or a curvature of a corresponding adjacent section of the boundary 306. For example, in the magnified view of 502, a relatively large triangle 508 is adjacent to a relatively smooth section of the boundary 306, whereas a relatively small triangle 510 is adjacent to a relatively curved section of the boundary 306 (the triangle 510 is smaller than the triangle 508). Thus, a size of a triangle adjacent to a section of the boundary 502 is based on a curvature of that section of the boundary 502.

Similarly, in the magnified view of 502, a relatively large triangle 512 is adjacent to a relatively smooth section of the user-defined stroke 308, whereas a relatively small triangle 514 is adjacent to a relatively curved section of the user-defined stroke 308 (triangle 514 is smaller than the triangle 512). Thus, a size of a triangle adjacent to a section of the user-defined stroke 308 is based on a curvature of that section of the user-defined stroke 308. Triangles that are not adjacent to either the user-defined stroke 308 or the boundary 306 can, in some examples, be of somewhat equal size, although in some other examples the sizes of such triangles can also vary.

In some embodiments, corners of the triangles of the mesh 504 form vertices of the mesh 504. Thus, a plurality of vertices of the mesh 504 is spread throughout the region 304 of the image 300.

In some embodiments, the mesh 504 is generated using Conforming Delaunay Triangulation (CDT), although any other type of mesh generation methodology can be adapted, as long as the triangles of the mesh 504 are spread throughout (e.g., tiling or tessellating) the region 304. For example, to generate the mesh 504, the input geometry (e.g., the region 304 including the boundary 306 and/or the user-defined strokes 308) is planarized. In some embodiments, an offset can be applied for robustness, so that boundary curves do not get over-flattened during sampling. In some embodiments, points are adaptively sampled along the boundary 306 and color primitives are added as vertices and edges, to generate a triangle mesh using, for example, the CDT. In some embodiments, a clipping path (e.g., which can be identical to boundary) is applied to the triangle mesh 504, to ensure smooth edges. In some examples, one or more user-defined strokes 308 (e.g., each user-defined stroke 308) is also flattened and the resulting vertices and edges are added as Stenier points for triangulation using the CDT. Edges generated by flattening the user-defined strokes 308 are labelled appropriately, to establish correspondence between the user-defined strokes 308 and mesh edges, thereby enabling subsequent traversal in the generated mesh 504. This set of vertices and edges are triangulated using, for example, the CDT algorithm.

Figure 5B:
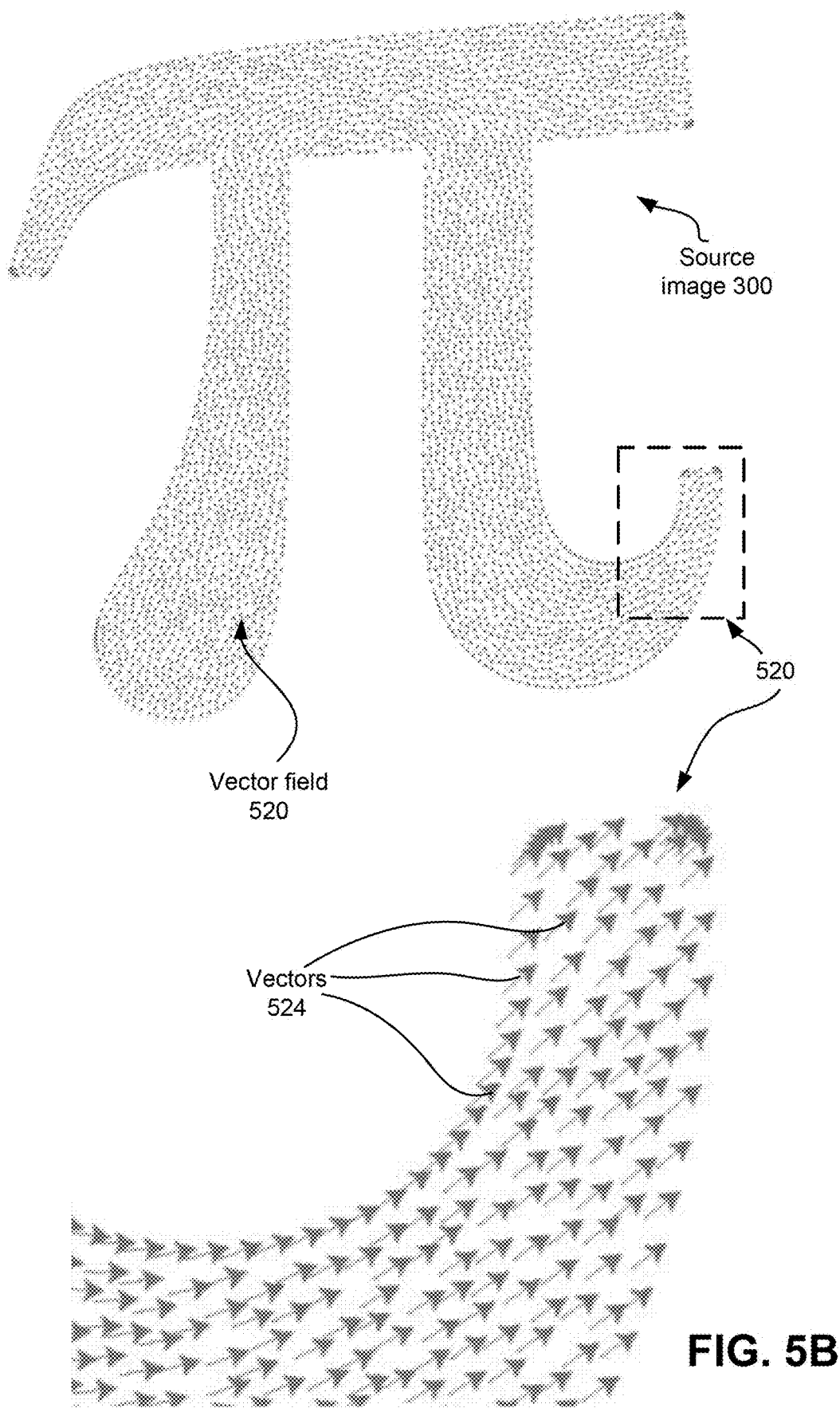

Referring again to FIG. 4B, the method 412 then proceeds from 412a to 412b. At 412b, the system 102 (e.g., the vector field generation module 106 of the system 102, as illustrated in FIG. 1) generates, based on the user-defined brush stroke, a vector field comprising plurality of tangential vectors covering the region 304. In some examples, each vertex of the mesh 504 is associated with a corresponding tangential vector having a corresponding direction. FIG. 5B illustrates a vector field 520 comprising vectors 524 generated for the image 300. In FIG. 5B, a magnified view of a section 520 of the image 300 is illustrated in a bottom section of FIG. 5B.

Some vectors 524 of the vector field 520 are better illustrated and legible in the magnified view of the section 520. In the non-magnified view of the full image 300 in the top section of FIG. 5B, the vectors 524 appear to be mere dots, although each such dot represents a corresponding vector.

As illustrated in FIG. 5B, the vector field 520 comprises the plurality of vectors 524. Each vector 524 originates at a corresponding vertex of the mesh 504 of FIG. 5A. For example, as discussed with respect to FIG. 5A, corners of the triangles of the mesh 504 form vertices of the mesh 504. Thus, a corner of a triangle of the mesh 504 will have a corresponding vertex 524. As illustrated in FIG. 5A, a corner of a triangle coincides with one or more corners of one or more adjacent triangles, and all overlapping or co-located corners have a single corresponding vector 524. As the triangles of the mesh 504 fill the region 304, the vectors 524 of the vector field 520 also cover the region 304.

Figure 5C:
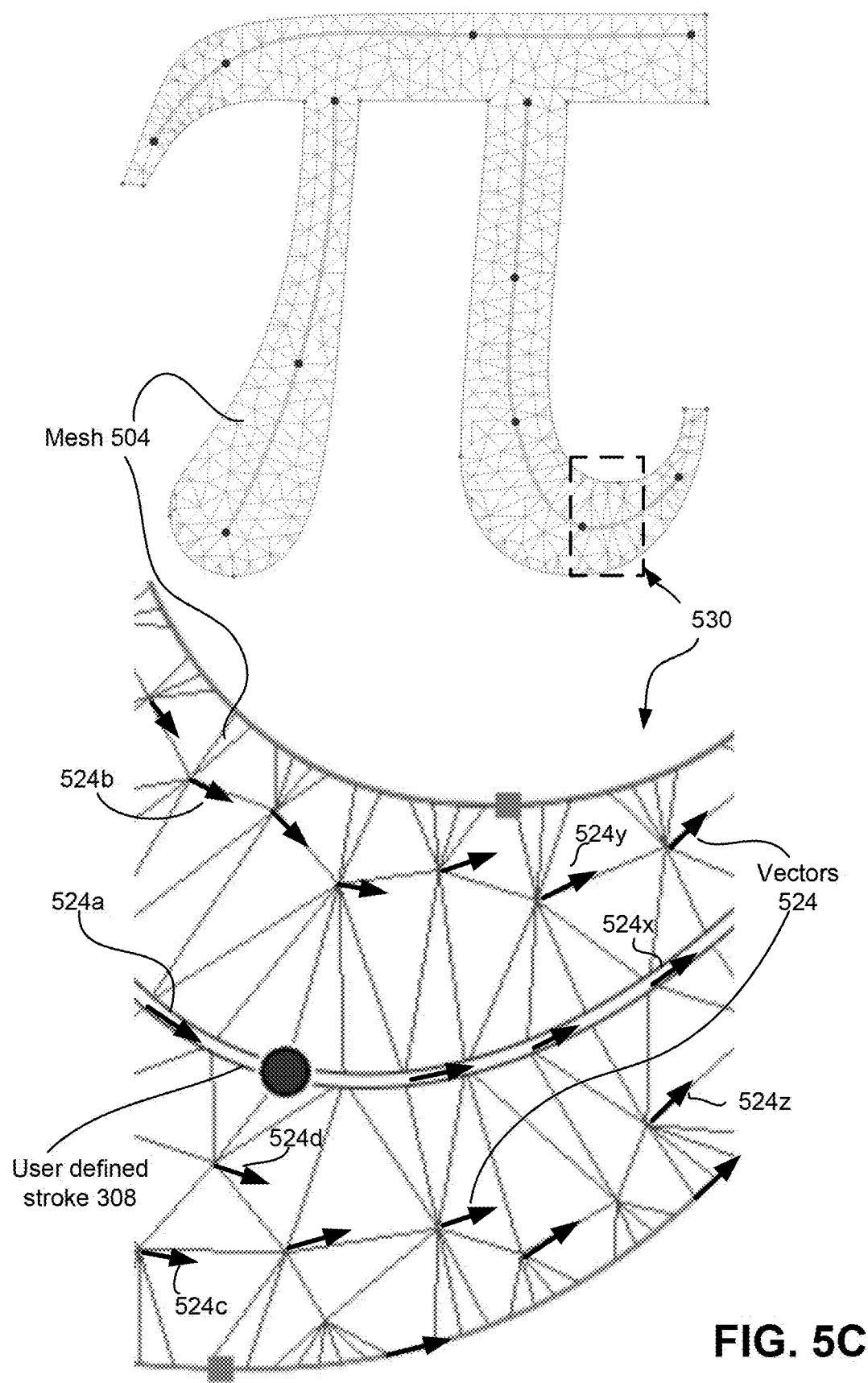

FIG. 5C illustrates a magnified view of a section 530 of the image 300, along with illustration of some example vectors 524. Note that not all vectors corresponding to each of the vertices in the magnified view of section 530 are illustrated—rather, only some of the vectors 524 for the section 530 are illustrated for purposes of illustrative clarity.

As illustrated, each vector originates from lo-located corners of adjacent triangles. Note that FIGS. 5B and 5C are not drawn according to scale.

In some embodiments and as illustrated in FIGS. 5B, 5C, each vector 524 has a corresponding direction. For example, a vector 524 that overlaps a section of a user-defined stroke 308 is tangential to the section of the user-defined stroke 308. For example, FIG. 5C illustrates vector 524a overlapping a section of the user-defined stroke 308. Hence, the vector 524a is in a direction that corresponds to a direction of the section of the user-defined stroke 308.

In some embodiments, since user-defined strokes 308 are represented as cubic Bezier splines, computing tangent direction at a point on the spine is done by determining the parametric value, t of the section of the user-defined stroke 308 with which the vector overlaps, and then taking a first derivative of the parametric value. For example, tangent direction of the vector 524a at a point on the spine is calculated by determining the parametric value, t of the corresponding section of the user-defined stroke 308, and then taking a first derivative of the parametric value t.

In some examples, a vector 524 that does not overlap a section of a user-defined stroke 308 is somewhat parallel to a nearby section of the user-defined stroke 308. For example, there is no major disjoint in direction of adjacent vectors 524. For example, any two adjacent vectors are parallel, or substantially parallel (e.g., have an angle of at most 10 degrees or 20 degrees, where an angle of 0 degree indicates the two vectors are parallel). Thus, the vector field 520 has a smoothness in directions of the vectors 524, and there is no sudden shift in direction of adjacent vectors.

For example, referring to FIG. 5C, vector 524a overlaps with a section of a user-defined stroke 308, and is tangential to the section of the user-defined stroke 308. That is, the direction of the vector 524a is similar to the direction of the section of the user-defined stroke 308. Also, vectors 524b, 524c, and 524d are nearby the vector 524a, and hence, the vectors 524b, 524c, and 524d are parallel or substantially parallel (e.g., have an angle of at most 10 degrees or 20 degrees, where an angle of 0 degree indicates the two vectors are parallel) to the vector 524a.

Similarly, vector 524x overlaps with another section of the user-defined stroke 308, and is tangential to the section of the user-defined stroke 308. Also, vectors 524y and 524z are nearby the vector 524x, and hence, the vectors 524y and 524z are parallel or substantially parallel with respect to the vector 524x.

In some embodiments and as discussed herein, the shape boundary 306 is also used as constraints while generating the directions of the vectors of the vector field 520. For example, for sections of the region 304 that are not close to the boundary, the corresponding vectors of the vector field 520 follow the internal user-defined strokes. As the vector field 520 approaches the shape boundary 306, the vectors follow the flow of the boundary 306. It may be noted that the shape boundary 306 provides the angle of flow for the vector field. Thus, the direction of the vectors near the boundary can be calculated from the nearby or adjacent vectors. In some examples, if a user-defined stroke is over or substantially close to the boundary 306, a vector of the vector field 520 can snap the orientation to the tangent direction specified by the curve boundary 306, and choose the direction based on the user-defined stroke. Thus, put differently, directions of individual vectors within the vector field 520 are based on a combination of the user-defined strokes, a shape of the boundary, and/or a proximity of a vector to the boundary. In some examples, the vector field 520 aligns with the shape contour defined by the boundary 306, and is guided by the user-defined strokes.

In some embodiments, the generation of the vector field 520 is formulated as a bi-harmonic solve to compute tangent directions at each vertex of the mesh 504. To establish boundary conditions for the solve, tangential values are computed using vectors that are on the user-defined strokes 308.

In further details, the vector field generation module 106 generates a smooth, two-dimensional vector field 520 over the region 304. In some examples, the vector field generation process is modelled as a solution to the bi-Laplacian equation, where 2 weights (e.g., one for the X direction and another for the Y direction) are computed for each vertex of the triangle mesh 304, corresponding to the direction of the vector field at that vertex. For example:

$$\Delta^2 w_i = 0,\qquad\text{Equation 1}$$

where $w_i$ denotes weights representing the $i^{th}$ unit vector over all mesh vertices in a domain (D). The final direction at a mesh vertex $p \in D$ is then an aggregation of all unit vectors. Since the image 300 and the vector field 520 is two-dimensional, there are two unit-vectors for a mesh vertex p, represented as:

$$(w_i(p), w_j(p)),\qquad\text{Equation 2}$$

where for a mesh vertex $p \in D$, the value $w_i(p)$ represents a unit vector (e.g., unit vector at a tangential direction) along the X(i) axis, and $w_j(p)$ represents a unit vector along the Y(j) axis. Equation (1) is equivalent to minimizing the Laplacian energy:

$$\min_{w_i, i=1,\ldots,n} \sum_{i=1}^{n} \frac{1}{2} \int_D (\Delta^2 w_i) dA,\qquad\text{Equation 3}$$

where n is a number of dimensions of the vector field 520. For the two-dimensional images discussed in this disclosure, n=2 in equation 3. In some embodiments, in equation 3, the Laplacian energy is minimized, subject to boundary conditions which are added as set of linear constraints. In some examples, the boundary conditions are derived from user-defined strokes 308. For example, at each vertex in the mesh 504 belonging to a user-defined stroke 308 (e.g., which are identified using the labels set during the mesh generation), individual tangent directions on the user-defined strokes 308 are calculated and set as boundary conditions for the bi-Laplacian solve. For example, referring to FIG. 5C, the direction of the vectors 524a and 524x are, along with other vectors on the user-defined strokes 308, added as boundary conditions for the bi-Laplacian solve. In some embodiments, since user-defined strokes 308 are represented as cubic Bezier splines, computing tangent direction at a point on the spine is done by determining the parametric value, t, and then taking a first derivative of the parametric value. Since the tangential field is computed, in some examples, as a solution to bi-Laplacian equation, the vector field 504 is smooth over the area of mesh 504.

In some embodiments, if the vector field 504 is not sufficiently smooth over the area of mesh 504 (e.g., if one or more adjacent vectors have an angle more than a threshold, such as more than 20 degrees or 25 degrees), the mesh 504 is regenerated using smaller sized triangles, and the vector field 504 is regenerated. Thus, if the vector field 504 is not sufficiently smooth over the area of mesh 504, the operations at blocks 412a and 412b can be iteratively repeated (with the size of the triangles of the mesh 504 made iteratively smaller in size), until the vector field 504 is sufficiently smooth over the area of mesh 504.

Referring again to FIG. 4B, the method 412 then proceeds from 412b to 412c, where the system 102 (e.g., the stroke generation module 108 of the system 102, illustrated in FIG. 1) generates one or more synthesized stroke(s), based on the plurality of tangential vectors 524 of the vector field 520. For example, using the vector field 520, the stroke generation module 108 synthesizes smooth streamlines or strokes 316, by fitting Bezier curves with respect to the user-defined strokes 308.

Figure 5D:
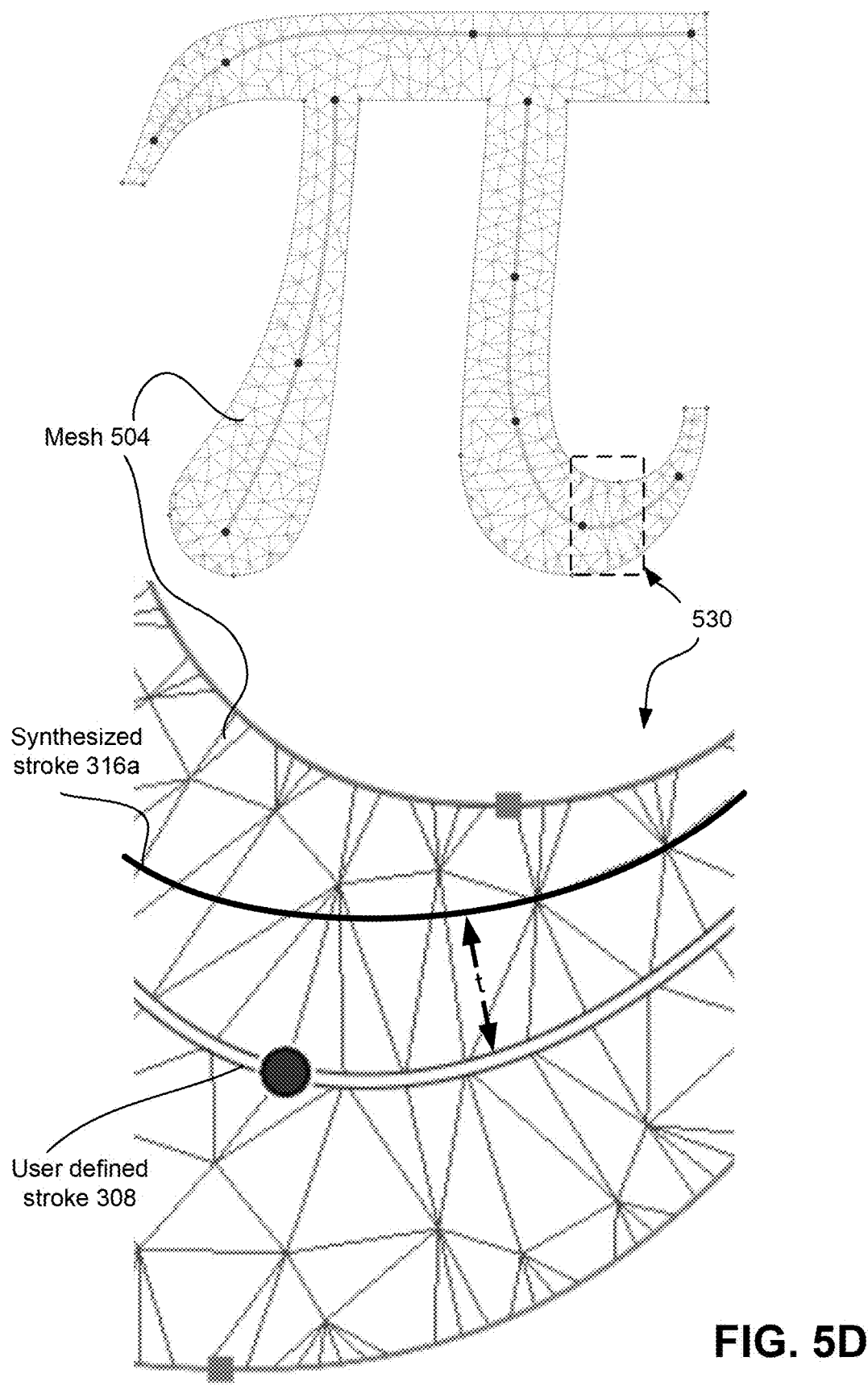
Figure 5E:
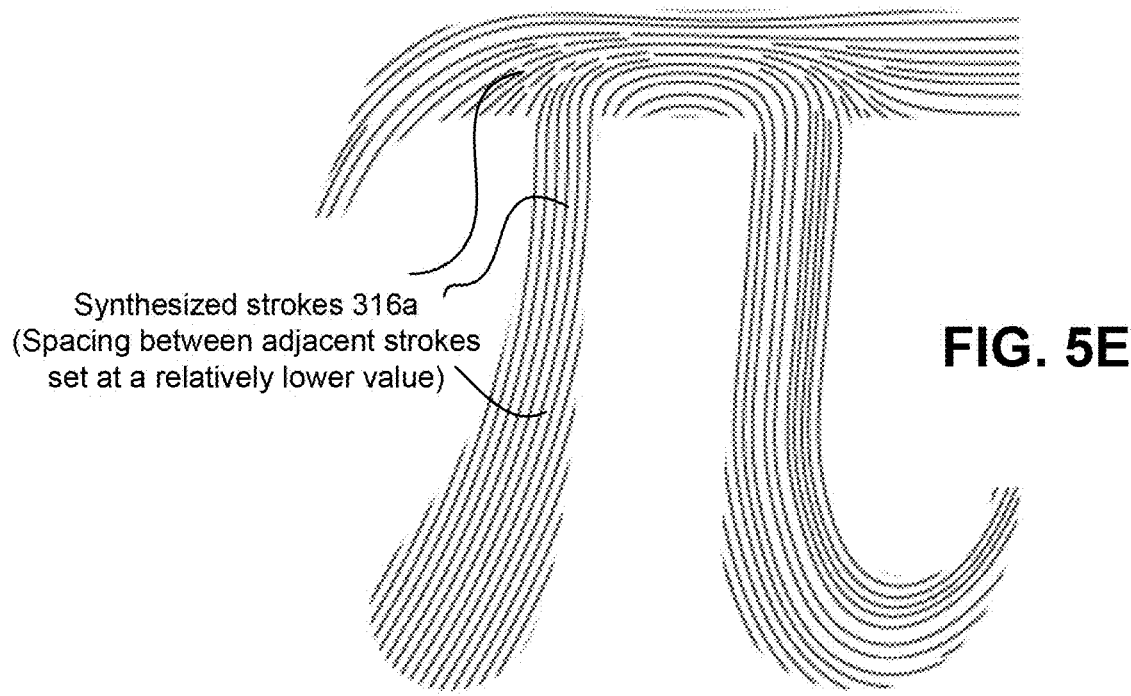
Figure 5F:
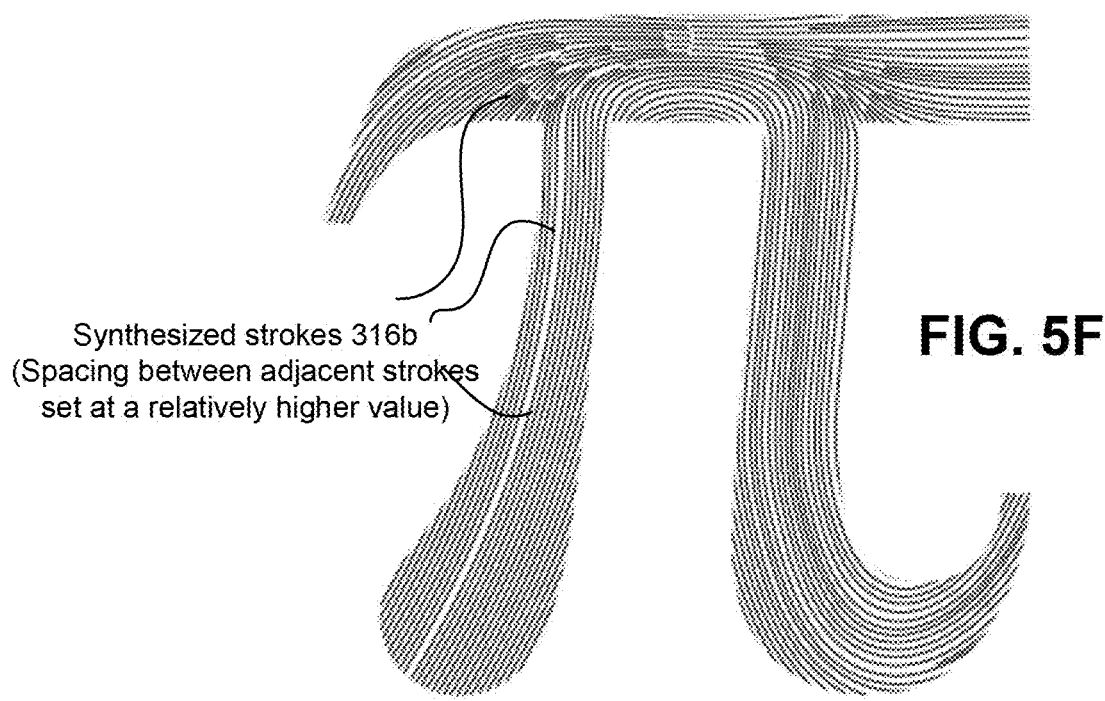

In some embodiments, a spacing between the synthesized strokes(s) 316 is a user-configurable parameter or attribute, which can have a default value in case the user does not set this parameter. For example, FIG. 5E illustrates synthesized strokes 316a generated based on a first spacing between adjacent strokes set at a relatively lower value, and FIG. 5F illustrates synthesized strokes 316b generated based on a second spacing between adjacent strokes set at a relatively higher value. Thus, the synthesized strokes 316a in FIG. 5E are relatively farther spaced from each other, and the synthesized strokes 316b in FIG. 5F are relatively closely spaced from each other. In some embodiments, the synthesized strokes 316 are traced by the system 102 using a modified line tracing mechanism, e.g., which aims to avoid the formation of short lines and optimize spacing. A spacing "t" between two adjacent strokes 316 can be given as an input parameter. For example, FIG. 5D illustrates part of a stroke 316a that is at a distance t from the user-defined stroke 308.

In some embodiments, a width of the strokes 316 is also a user-configurable parameter. For example, for a given spacing t between the strokes, if the width of the strokes is set at a relatively high value, then relatively fewer strokes are needed to cover the region 304. On the other hand, for the given spacing t between the strokes, if the width of the strokes is set at a relatively low value, relatively more strokes are needed to cover the region 304.

To initialize synthesizing the paths for the strokes 316, the stroke generation module 108 uses a priority queue of potential seed points (e.g., which form starting points of the stroke paths to be synthesized) for new strokes to be synthesized. The seed points are based on the end points of the user-defined strokes 308. At each iteration (where during one iteration, one stroke 316 is synthesized), a seed is considered from this queue—if the seed is sufficiently distant from nearby synthesized strokes (where the sufficiently distant is determined based on spacing parameter "t"), the seed is used to synthesize a path for a new stroke 316. Thus, seed points used for synthesizing the strokes are roughly spaced at distance t from each other, in some examples, such that the strokes 316 maintain the spacing parameter t. If a seed point is too close (e.g., closer than the spacing t) to any previously synthesized stroke or a user-defined stroke, then that seed point is ignored. In some embodiments, a seed point coincides with a vertex of the mesh 504. In some embodiments, the seed points also depend on the user-configurable width of the strokes.

In some embodiments, subsequent to selection of a seed point, the stroke generation module 108 starts tracing (synthesizing) a path for a stroke 316 from the seed point. That is, the stroke generation module 108 starts generating or synthesizing a path for stroke 316 from the seed point. For example, a direction of tracing is the direction of the vector of the vector field 520 that starts from the seed point. Once traversing a unit length (where each vector 524 is also of unit length), the direction of the path of the stroke 316 is again re-evaluated.

For example, assume that the stroke 316 has reached a point p1, which coincides with, or is within a threshold distance from a vertex V1 of the mesh 520. In such a case, a direction of the stroke 316 at point p1 is a direction of a vector that originates at the vertex V1. Put differently, a direction of a section of the path of the stroke 316 (where the section initiates from point p1) is the direction of the vector initiating from the vertex V1 (e.g., as the initiation point p1 is within a threshold distance from the initiation point of the vector, which is the vertex V1).

Assume that the stroke 316 has now reached another point p2, which is further than a threshold distance from a nearest vertex. For example, assume that the point p2 is inside (or on an edge) of a triangle of the mesh 520. In such a case, nearby vertices Va, Vb, and Vc of the mesh 520, which are nearest to the point p2, are identified (although three vertices are identified, in an example, one, two, four, or higher number of vertices can also be identified instead). In an example, if the point p2 is within a triangle of the mesh 520, then the vertices Va, Vb, and Vc are simply corners of the triangle. Now, a direction of the stroke 316 at point p2 can be determined by interpolating directions of the vectors originating at the vertices Va, Vb, and/or Vc. Put differently, a direction of a section of the path of the stroke 316 (where the section initiates from point p2) is calculated by interpolation of two or more vectors neighboring the initiation point p2 of the section of the path (e.g., as the initiation point p2 is not within a threshold distance of an initiation point of any vector).

Thus, the stroke 316 starts from a seed point, and a path of the stroke 316 is synthesized based on the vector field 520. In some embodiments, the stroke 316 is terminated if the stroke 316 comes sufficiently close (e.g., less than the previously discussed spacing parameter t) from another stroke, and/or when the stroke 316 reaches the boundary 306. After the path of a stroke 316 is fully synthesized (the stroke is terminated), a seed point for an adjacent stroke is calculated. For example, assume a first seed point is used to synthesize a first stroke. A second seed point for an adjacent second stroke is selected at a distance t (e.g., where t is the spacing parameter) from the first seed point and in a first direction that is orthogonal to a direction of the first stroke at the first seed point. If appropriate, a third seed for an adjacent third stroke is also populated at the distance t from the first seed point and in a second direction that is also orthogonal to the direction of the first stroke at the first seed point. Thus, the second and third strokes are on two opposite sides of the first stroke. In this manner, paths for multiple strokes 316 are synthesized by the system 102, where the strokes 316 fill the region 304.

Figure 5G:
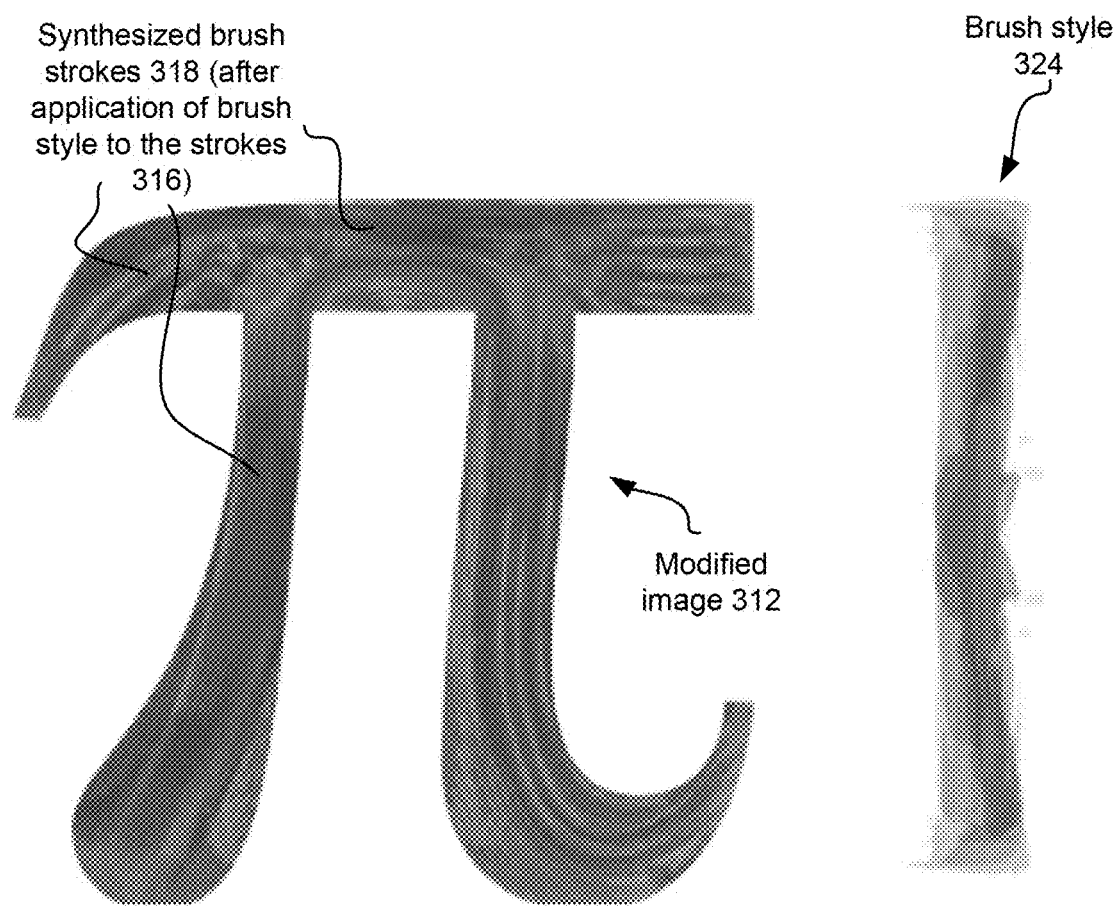
Figure 5H:
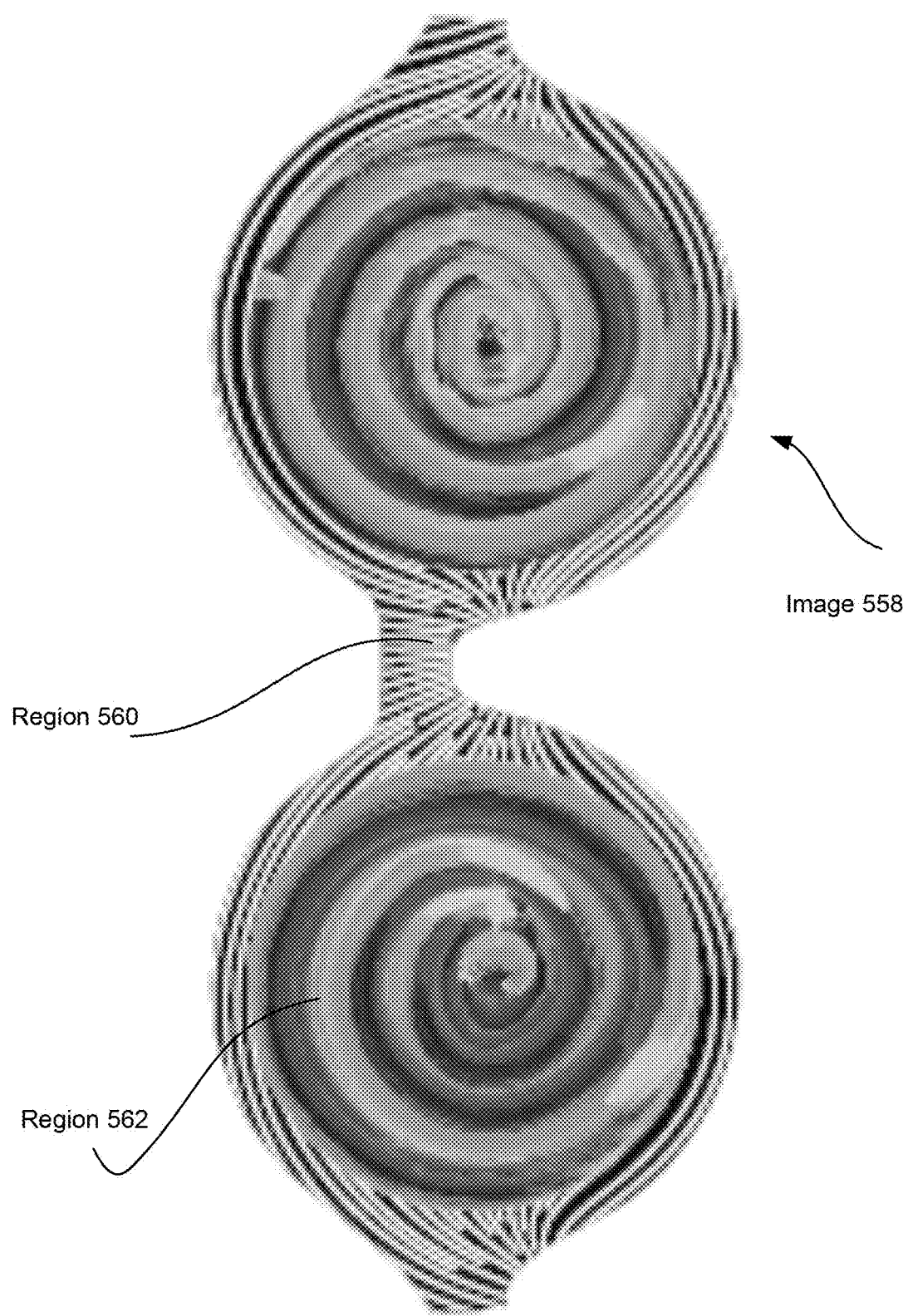

Referring again to FIG. 4B, once the strokes 316 are synthesized (the path of the strokes 316 are synthesized), the method 412 proceeds from 412c to 412d, where the system 102 (e.g., the brush application module 110 of the system 102, illustrated in FIG. 1) applies a brush style to the synthesized strokes 316, to generate synthesized brush strokes 318. Brush style comprises user-configurable parameters defining a color of the brush, a texture of the brush, a type of brush, a thickness of the brush, and/or another appropriate brush attribute. For example, FIG. 5G illustrates the image 300, after brush style 324 has been applied to the synthesized strokes 316, to generate synthesized brush strokes 318. FIG. 5G is similar to FIG. 3D. FIG. 5H illustrates another image 558 having a first region 560 and a second region 562, where a first brush style is applied to the strokes (e.g., user defined strokes and/or synthesized strokes) within the region 560 and a second brush style is applied to the strokes (e.g., user defined strokes and/or synthesized strokes) within the region 562. The brush style can be user-configurable, although the system 102 can apply a default brush style.

Referring again to FIG. 4B, the method 412 proceeds from 412d to 412e, where the system 102 determines if there has been any change in a first parameter defining a spacing "t" between adjacent strokes, and/or a second parameter defining a width "w" of the strokes. Any change in either or both these parameters would necessitate changing the synthesized strokes 316. If "Yes" at 412e, the method 412e loops back to 412c, where the system 102 re-generates the synthesized stroke(s) 316 using the new values of the parameters. If "No" at 412e, the method 412 ends at 412f. Although the block 412e is illustrated immediately after the block 412d, the block 412e can be triggered whenever there is a change in the parameters defining the spacing "t" and/or the width "w" of the strokes. For example, the block 412e can be triggered after the block 416 of FIG. 4A (after the synthesized strokes 316 are displayed), if there is a change in the parameters defining the spacing "t" and/or the width "w" of the strokes while the image is being displayed.

In some examples, even after the completion of the method 400 of FIG. 4A (after the display of the image along with the synthesized brush strokes 318), the generated vector field 520 and the associated strokes 316 (without the brush style applied thereon) are retained. Whenever the user switches to a different brush style, the strokes 316 are automatically adjusted as per new brush style.

Similarly, whenever the user selects to different spacing between the synthesized brush strokes and/or switches a width of the synthesized brush strokes, the previously generated vector field 520 is re-used to re-synthesize the strokes in accordance with the new parameters. This enables the user to quickly explore variations with different brush styles, different spacing, and/or different width, thereby eliminating the time and effort required for re-painting the graphic manually and repeatedly.

As discussed, the system 102 assists users to easily paint digital art using brushes. For example, as discussed herein, the user can draw a few user-defined strokes, which are then used to synthesize brush strokes to completely paint a given region of the image. A user is free to provide as few or as many user-defined strokes, and the system effectively auto-completes the painting by synthesizing additional brush strokes to fill the region. The synthesized strokes are in general direction of the user-defined strokes, and are synthesized based on the user-defined strokes.

Numerous variations and configurations will be apparent in light of this disclosure and the following examples.

Example 1. A method for populating a region of an image with a plurality of brush strokes, the method comprising: causing display of the image, with the region of the image bounded by a boundary; receiving input that is indicative of a user-defined brush stroke within the region; generating one or more synthesized brush strokes within the region, based on the user-defined brush stroke, the one or more synthesized brush strokes filling at least a part of the region of the image; and causing display of the image, along with the user-defined brush stroke and the one or more synthesized brush strokes within the region of the image.

Example 2. The method of example 1, wherein generating the one or more synthesized brush strokes includes: generating, based on the user-defined brush stroke, a mesh covering the region, the mesh comprising a plurality of vertices spread throughout the region; generating, based on the user-defined brush stroke, a plurality of vectors covering the region, such that each vertex of the mesh is associated with a corresponding vector having a corresponding direction; and generating a synthesized brush stroke, based on the plurality of vectors.

Example 3. The method of example 2, wherein generating the mesh comprises: dividing the user-defined brush stroke into a plurality of sections; and generating the mesh comprising a plurality of triangles covering the region, wherein a size of an individual triangle is based on a curvature of a corresponding adjacent section of the user-defined brush stroke and/or a curvature of a corresponding adjacent section of the boundary; wherein each section of the user-defined brush stroke overlaps a corresponding edge of a corresponding triangle of the mesh, and wherein a corner of a triangle forms a corresponding vertex of the mesh.

Example 4. The method of example 3, wherein the plurality of triangles covering the region are generated such that there is no overlapping or gap between adjacent triangles.

Example 5. The method of any of examples 2-4, wherein generating the one or more synthesized brush strokes comprises: generating a path of a synthesized brush stroke, such that a section of the path is in a direction of a vector of the plurality of vectors, based on a start of the section of the path and a start of the vector substantially coinciding or being within a threshold distance.

Example 6. The method of example 5, wherein the section of the path is a first the section of the path, the direction is a first direction, and wherein generating the one or more synthesized brush strokes comprises: generating the path of the synthesized brush stroke, such that a second section of the path is in a second direction that is calculated by interpolation of directions of two or more vectors of the plurality of vectors, based on (i) a start of the second section not substantially coinciding or being within the threshold distance of a start of any vector and (ii) the start of the second section being within another threshold distance from the two or more vectors.

Example 7. The method of any of examples 1-6, wherein the user-defined brush stroke is a first user-defined brush stroke that is within a first portion of the region of the image, wherein the one or more synthesized brush strokes are one or more first synthesized brush strokes that are within the first portion of the region of the image, and wherein the method further comprises: receiving another input that is indicative of a second user-defined brush stroke within a second portion of the region of the image; and generating one or more second synthesized brush strokes within the second portion of the region of the image, based on the second user-defined brush stroke.

Example 8. The method of any of examples 1-7, wherein after the user-defined brush stroke and the one or more synthesized brush strokes have been applied to the region, the method further comprises: receiving a selection of one or more attributes for brush strokes; and applying the one or more attributes to the user-defined brush stroke and/or at least one of the one or more synthesized brush strokes.

Example 9. The method of example 8, wherein the one or more attributes comprises one or more of a stroke width, a stroke texture, and/or a stroke color.

Example 10. The method of any of examples 1-9, wherein generating the one or more synthesized brush strokes includes: receiving a selection of an attribute indicative of a spacing between brush strokes; and generating the one or more synthesized brush strokes, such that the spacing is maintained between adjacent ones of the user-defined and synthesized brush strokes.

Example 11. The method of any of examples 1-10, wherein the one or more synthesized brush strokes comprises one or more first synthesized brush strokes, and wherein the method further comprises: subsequent to generating the one or more first synthesized brush strokes, receiving selection of one or both of (i) a first attribute indicative of a spacing between brush strokes, and/or (ii) a second attribute indicative of a width of brush strokes, the first and/or second attributes different from corresponding attributes used to generate the one or more first synthesized brush strokes; and replacing the one or more first synthesized brush strokes with one or more second synthesized brush strokes, such that the one or more second synthesized brush strokes have the spacing and/or the width indicated in the first and/or second attributes.

Example 12. The method of any of examples 1-11, wherein: the boundary of the region of the image is defined by one or more Bezier curves.

Example 13. A system for synthesizing one or more brush strokes in an image, the system comprising: one or more processors; and a stroke generation system executable by the one or more processors to receive a selection of a region of the image, the region defined by a boundary; receive an input indicative of a first path of a first brush stroke within the region; divide the first path into a plurality of sections, such that a length of a section is based on a curvature of the first path at the section; generate a mesh covering the region, the mesh comprising a plurality of triangles, such that each section of the first path overlaps with a corresponding edge of a corresponding triangle of at least a subset of the plurality of triangles; generate a vector field comprising a plurality of vectors covering the region, wherein each corner of each triangle is associated with a corresponding vector of the plurality of vectors; synthesize one or more second paths based on the plurality of vectors of the vector field, the one or more second paths within the region; apply one or more brush stroke attributes to the one or more second paths, thereby synthesizing one or more second brush strokes; and cause display of the image, with the first brush stroke and the one or more second brush strokes.

Example 14. The system of example 13, wherein to synthesize the one or more second paths, the stroke generation system is to: synthesize a first section of a second path, such that the first section is in a first direction of a first vector, based on an initiation point of the first section and an initiation point of the first vector being within a threshold distance of each other; and synthesize a second section of the second path, such that the second section is in a second direction that is calculated by interpolation of two or more vectors, based on an initiation point of the second section not being within the threshold distance of an initiation point of any vector.

Example 15. The system of example 14, wherein the initiation point of the second section of the second path is within a triangle of the mesh, and the two or more vectors start from two or more corresponding corners of the triangle.

Example 16. The system of any of examples 13-14, wherein to synthesize the one or more second paths, the stroke generation system is to: select an initiation point to initiate a second path, the initiation point of the second path at a distance from another initiation point of another path, the distance being either a default spacing or a user-configured spacing between two adjacent paths.

Example 17. The system of any of examples 13-16, wherein the one or more brush stroke attributes comprises a color of brush stroke, a width of brush stroke, and/or a texture of brush stroke.

Example 18. A computer program product including one or more non-transitory machine-readable mediums encoded with instructions that when executed by one or more processors cause a process to be carried out for populating an image with one or more brush strokes, the process comprising: causing display of the image; receiving an input that is indicative of a user-defined path of a first brush stroke within the image; generating a second brush stroke within the image, based on the first brush stroke, both the first and second brush strokes confined within a section of the image; and causing display of the image, along with the first brush stroke and the second brush stroke.

Example 19. The computer program product of example 18, wherein generating the second brush stroke comprises: generating, based on the user-defined path of the first brush stroke, a mesh covering at least the section of the image, the mesh comprising a plurality of vertices spread throughout the section of the image; generating, based on the user-defined path of the first brush stroke, a plurality of vectors covering the section of the image, such that each vertex of the mesh is associated with a corresponding vector having a corresponding direction; generating a path of the second brush stroke, based on the plurality of vectors; and applying a user-configurable brush style to the path of the second brush stroke, to generate the second brush stroke.

Example 20. The computer program product of any of examples 18-19, wherein the section of the image is bounded by a boundary comprising one or more Bezier curves.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for populating a region of an image with a plurality of brush strokes, the method comprising:
   causing display of the image, with the region of the image bounded by a boundary;
   receiving input that is indicative of a user-defined brush stroke within the region;
   generating one or more synthesized brush strokes within the region, based on the user-defined brush stroke, the one or more synthesized brush strokes filling at least a part of the region of the image, wherein generating the one or more synthesized brush strokes includes:
   generating, based on the user-defined brush stroke, a mesh covering the region, the mesh comprising a plurality of vertices spread throughout the region,
   generating, based on the user-defined brush stroke, a plurality of vectors covering the region, such that each vertex of the mesh is associated with a corresponding vector having a corresponding direction, and
   generating the one or more synthesized brush strokes based on the plurality of vectors; and causing display of the image, along with the user-defined brush stroke and the one or more synthesized brush strokes within the region of the image.

2. The method of claim 1, wherein generating the mesh comprises:
dividing the user-defined brush stroke into a plurality of sections; and
generating a plurality of triangles covering the region;
wherein each section of the user-defined brush stroke overlaps a corresponding edge of a corresponding triangle of the mesh.

3. The method of claim 2, wherein the plurality of triangles covering the region are generated such that there is no overlapping or gap between adjacent triangles.

4. The method of claim 1, wherein generating the one or more synthesized brush strokes comprises:
generating a path having a section in a particular direction of a particular vector of the plurality of vectors.

5. The method of claim 4,
wherein the section of the path is a first the section of the path,
wherein the particular direction is a first direction, and
wherein a second section of the path is in a second direction that is calculated by interpolation of directions of two or more vectors of the plurality of vectors, based on (i) a start of the second section not substantially coinciding or being within a first threshold distance of a start of any of the plurality of vectors and (ii) the start of the second section being within a second threshold distance from the two or more vectors.

6. The method of claim 1, wherein the user-defined brush stroke is a first user-defined brush stroke that is within a first portion of the region of the image, wherein the one or more synthesized brush strokes are one or more first synthesized brush strokes that are within the first portion of the region of the image, and wherein the method further comprises:
receiving another input that is indicative of a second user-defined brush stroke within a second portion of the region of the image; and
generating one or more second synthesized brush strokes within the second portion of the region of the image, based on the second user-defined brush stroke.

7. The method of claim 1, further comprising:
receiving a selection of one or more brush stroke attributes; and
applying the one or more brush stroke attributes to the user-defined brush stroke and/or at least one of the one or more synthesized brush strokes.

8. The method of claim 7, wherein the one or more brush stroke attributes comprises one or more of a stroke width, a stroke texture, and/or a stroke color.

9. The method of claim 1, wherein generating the one or more synthesized brush strokes includes:
receiving a selection of an attribute indicative of a spacing between brush strokes; and
generating the one or more synthesized brush strokes, such that the spacing is maintained between adjacent ones of the user-defined and synthesized brush strokes.

10. The method of claim 1, wherein the one or more synthesized brush strokes comprises one or more first synthesized brush strokes, and wherein the method further comprises:
subsequent to generating the one or more first synthesized brush strokes, receiving selection of one or both of (i) a first attribute indicative of a spacing between brush strokes, and/or (ii) a second attribute indicative of a width of brush strokes, the first and/or second attributes different from corresponding attributes used to generate the one or more first synthesized brush strokes; and
replacing the one or more first synthesized brush strokes with one or more second synthesized brush strokes, such that the one or more second synthesized brush strokes have the spacing and/or the width indicated in the first and/or second attributes.

11. The method of claim 1, wherein:
the boundary of the region of the image is defined by one or more Bezier curves.

12. A system for synthesizing one or more brush strokes in an image, the system comprising:
one or more processors; and
a stroke generation system executable by the one or more processors to
receive a selection of a region of the image, the region defined by a boundary;
receive an input indicative of a first path of a first brush stroke within the region;
divide the first path into a plurality of sections, such that a length of a section is based on a curvature of the first path at the section;
generate a mesh covering the region, the mesh comprising a plurality of triangles, such that each section of the first path overlaps with a corresponding edge of a corresponding triangle of at least a subset of the plurality of triangles;
generate a vector field comprising a plurality of vectors covering the region, wherein each corner of each triangle is associated with a corresponding vector of the plurality of vectors;
synthesize one or more second paths based on the plurality of vectors of the vector field, the one or more second paths within the region;
apply one or more brush stroke attributes to the one or more second paths, thereby synthesizing one or more second brush strokes; and
cause display of the image, with the first brush stroke and the one or more second brush strokes.

13. The system of claim 12, wherein to synthesize the one or more second paths, the stroke generation system is to:
synthesize a first section of a second path, such that the first section is in a first direction of a first vector, based on an initiation point of the first section and an initiation point of the first vector being within a threshold distance of each other; and
synthesize a second section of the second path, such that the second section is in a second direction that is calculated by interpolation of two or more vectors, based on an initiation point of the second section not being within the threshold distance of an initiation point of any vector.

14. The system of claim 13, wherein the initiation point of the second section of the second path is within a triangle of the mesh, and the two or more vectors start from two or more corresponding corners of the triangle.

15. The system of claim 12, wherein to synthesize the one or more second paths, the stroke generation system is to:
select an initiation point to initiate a second path, the initiation point of the second path at a distance from another initiation point of another path, the distance being either a default spacing or a user-configured spacing between two adjacent paths.

16. The system of claim 12, wherein the one or more brush stroke attributes comprises a color of brush stroke, a width of brush stroke, and/or a texture of brush stroke.

17. A computer program product including one or more non-transitory machine-readable mediums encoded with instructions that when executed by one or more processors cause a process to be carried out for populating an image with one or more brush strokes, the process comprising:
   causing display of the image;
   receiving an input that is indicative of a user-defined path of a first brush stroke within the image;
   generating a second brush stroke within the image, based on the first brush stroke, both the first and second brush strokes confined within a section of the image, wherein generating the second brush stroke includes:
      receiving a selection of an attribute indicative of a spacing between brush strokes, and
      generating the second brush stroke such that the spacing is maintained between the first and second brush strokes; and
   causing display of the image, along with the first brush stroke and the second brush stroke.

18. The computer program product of claim 17, wherein generating the second brush stroke comprises:
   generating, based on the user-defined path of the first brush stroke, a mesh covering at least the section of the image, the mesh comprising a plurality of vertices spread throughout the section of the image;
   generating, based on the user-defined path of the first brush stroke, a plurality of vectors covering the section of the image, such that each vertex of the mesh is associated with a corresponding vector having a corresponding direction;
   generating a path of the second brush stroke, based on the plurality of vectors; and
   applying a user-configurable brush style to the path of the second brush stroke, to generate the second brush stroke.

19. The computer program product of claim 17, wherein the section of the image is bounded by a boundary comprising one or more Bezier curves.

* * * * *